US010207816B1

(12) United States Patent
Husain et al.

(10) Patent No.: US 10,207,816 B1
(45) Date of Patent: Feb. 19, 2019

(54) AERIALLY DISPERSIBLE MASSIVELY DISTRIBUTED SENSORLET SYSTEM

(71) Applicant: SparkCognition, Inc., Austin, TX (US)

(72) Inventors: Syed Mohammad Amir Husain, Georgetown, TX (US); John Rutherford Allen, Alexandria, VA (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/704,991

(22) Filed: Sep. 14, 2017

(51) Int. Cl.
*B64D 45/00* (2006.01)
*G01M 17/00* (2006.01)
*G07C 5/08* (2006.01)

(52) U.S. Cl.
CPC .............. *B64D 45/00* (2013.01); *G01M 17/00* (2013.01); *G07C 5/08* (2013.01)

(58) Field of Classification Search
CPC .......... B64D 45/00; G01M 17/00; G07C 5/08
USPC .................................................. 250/227.18
See application file for complete search history.

(56) References Cited

U.S. PATENT DOCUMENTS

| | | | |
|---|---|---|---|
| 5,076,192 A | 12/1991 | Tegel et al. | |
| 5,675,116 A | 10/1997 | Hillenbrand | |
| 5,995,882 A | 11/1999 | Patterson et al. | |
| 6,118,066 A | 9/2000 | Sirmalis et al. | |
| 6,376,762 B1 * | 4/2002 | French ............... | F41F 3/10 |
| | | | 102/341 |
| 7,290,496 B2 * | 11/2007 | Asfar ............... | B63C 11/42 |
| | | | 114/312 |
| 7,556,219 B2 | 7/2009 | Page et al. | |
| 8,091,461 B1 | 1/2012 | Buescher et al. | |
| 8,899,903 B1 | 12/2014 | Saad et al. | |
| 9,211,959 B2 | 12/2015 | Teller et al. | |
| 9,348,333 B1 * | 5/2016 | Buchmueller ....... | G05D 1/0011 |
| 9,387,928 B1 | 7/2016 | Gentry et al. | |
| 9,611,017 B2 | 4/2017 | Jeng | |
| 9,623,760 B2 | 4/2017 | Wang et al. | |
| 9,828,094 B2 | 11/2017 | McMillion et al. | |
| 9,944,404 B1 * | 4/2018 | Gentry ............... | B64D 45/00 |
| 2003/0152892 A1 | 8/2003 | Huang et al. | |
| 2008/0041294 A1 | 2/2008 | Diorio et al. | |
| 2011/0266086 A1 | 11/2011 | Welker et al. | |
| 2013/0081245 A1 | 4/2013 | Vavrina et al. | |
| 2013/0190792 A1 | 8/2013 | Backes | |
| 2015/0298786 A1 | 10/2015 | Stigler et al. | |

(Continued)

*Primary Examiner* — Seung C Sohn
(74) *Attorney, Agent, or Firm* — Toler Law Group, PC

(57) ABSTRACT

A distributed sensor module system comprises a plurality of sensor modules configured to be aerially deployable from a deployment device, the deployment device including an unmanned aerial vehicle (UAV) or an aeronautically deployable unitized container, the plurality of sensor modules configured to communicate with each other. A first sensor module comprises a first sensor configured to obtain first sensor information from a first environment proximate to the first sensor, a processor coupled to the first sensor, the processor configured to process the first sensor information to obtain locally processed first sensor information, and a communication transceiver coupled to the processor, the communication transceiver configured to communicate the locally processed first sensor information to a second sensor module, the first sensor module and the second sensor module configured to be aerially deployable.

19 Claims, 16 Drawing Sheets

(56) References Cited

U.S. PATENT DOCUMENTS

2016/0039541 A1    2/2016  Beardsley et al.
2016/0244135 A1    8/2016  Farber et al.
2016/0327956 A1*  11/2016  Zhang .................. B64C 39/024
2017/0285203 A1  10/2017  Fyffe et al.
2017/0350558 A1  12/2017  Heinen et al.

* cited by examiner

AERIALLY DISPERSIBLE MASSIVELY DISTRIBUTED SENSORLET SYSTEM

CROSS-REFERENCE TO RELATED APPLICATION(S)

The present application is related to co-pending U.S. Patent Application entitled "AUTONOMOUS VESSEL FOR UNMANNED COMBAT AERIAL VEHICLE (UCAV) CARRIER OPERATIONS" Ser. No. 15/704,855; co-pending U.S. Patent Application, entitled "STACKABLE UNMANNED AERIAL VEHICLE (UAV) SYSTEM AND PORTABLE HANGAR SYSTEM THEREFOR" Ser. No. 15/704,908; co-pending U.S. Patent Application entitled "ANTI-AIRCRAFT AUTONOMOUS UNDERSEA SYSTEM (AUS) WITH MACHINE VISION TARGET ACQUISITION" Ser. No. 15/704,949; and co-pending U.S. Application entitled "ARTIFICIAL INTELLIGENCE AUGMENTED REALITY COMMAND, CONTROL AND COMMUNICATIONS SYSTEM" Ser. No. 15/705,027, the entirety of which are herein incorporated by reference.

BACKGROUND

Field of the Disclosure

The present disclosure relates generally to a sensor system and, more particularly, to an aerially dispersible sensor system.

Background of the Disclosure

Effective decision-making benefits from situational awareness and knowledge of relevant facts. Decision-making with respect to geographical areas can benefit from knowledge of events and activities occurring in or near those geographical areas. However, traditional techniques for gaining information relating to geographical areas typically involve substantial costs and logistical considerations and can tie up valuable assets to attempt to gain the information.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
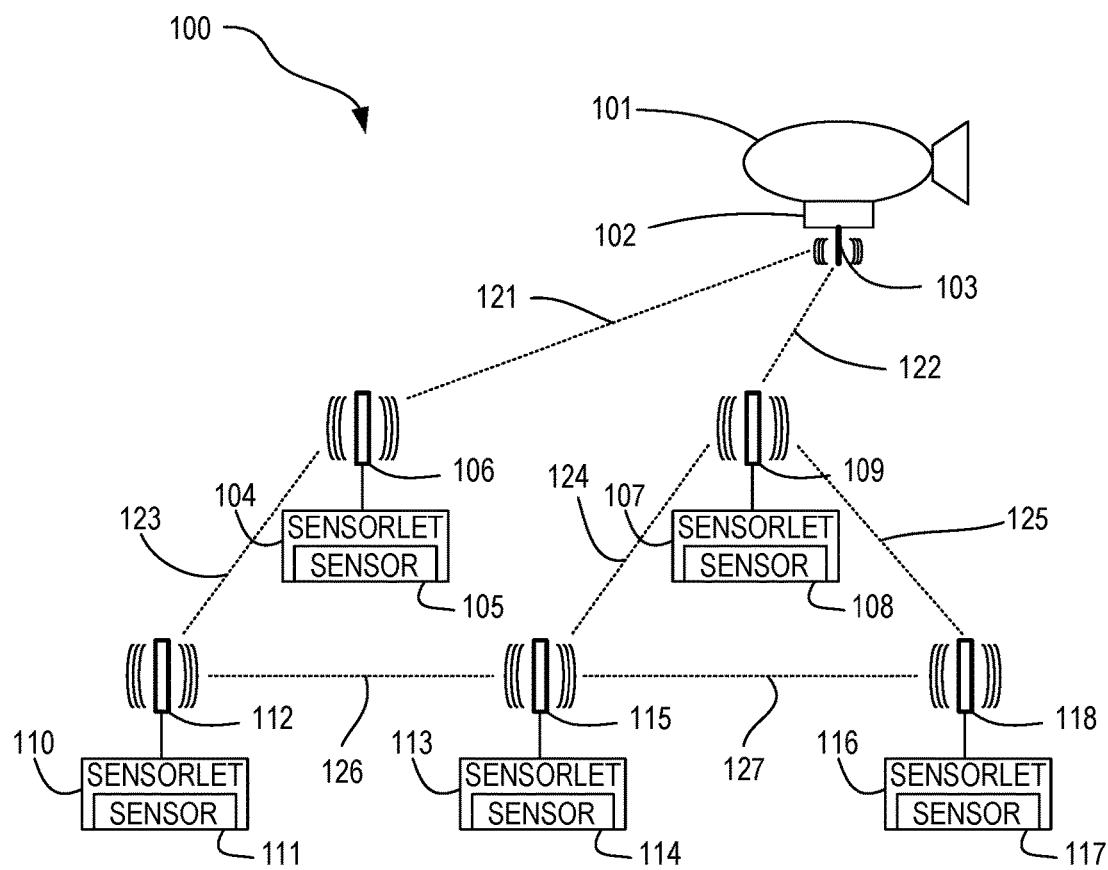
FIG. 1 is an elevation view diagram illustrating a distributed sensorlet system in accordance with at least one embodiment.

A distributed sensorlet system is provided. Inexpensive disposable small sensor modules, referred to as "sensorlets," are configured to be delivered via an unmanned aerial vehicle (UAV) or via an aeronautically deployable container, such as a CBU or Rockeye cluster bomb style container. Such a cluster bomb style container can be dropped by an aircraft as a unit from which a large number of sensorlets can be released, for example, via aerodynamically separable container portions or a linear shaped charge to cut open the container. The sensorlets can be deployed in large numbers to form a massively distributed sensorlet system.

In accordance with at least one embodiment, a distributed sensorlet system can be configured to provide instant intelligence information immediately upon deployment. As an example, a sensorlet can be battery powered and designed to last for a few days or weeks. As an example, a sensorlet can be small, robust, and adapted to blend in with an environment in which it is to be deployed. Examples of sources of data a sensorlet can obtain include vibration, location, optical, audio, and other sources.

Distributed sensorlets can be configured to communicate amongst each other, for example, via a mesh network (e.g., a sensor module network). The mesh network can adapt to the presence and absence of distributed sensorlets within range of communication with others of the distributed sensorlets. For example, if a distributed sensorlet fails, the remnants of the mesh network of which the failed distributed sensorlet was a part can reconfigure the paths of the mesh network to accommodate the absence of the failed sensorlet. The mesh network can serve to extend the communication range of the distributed sensorlets by progressively passing information to be communicated from one sensorlet to another sensorlet to yet another sensorlet. Thus, if a first sensorlet and a third sensorlet are not within range to communicate with each other directly, a second sensorlet can relay the information to be communicated and thereby extend the communication range.

Mesh networking can provide numerous capabilities. As one example, mesh networking can extend point-to-point communication among pairs of nodes. As examples, the pairs of nodes can be two sensorlets or a sensorlet and a gateway node. The gateway node (or another sensorlet) can serve as an endpoint of a backbone connection to allow information from the sensorlet to be transmitted to another resource apart from the sensorlets and any gateway nodes deployed with the sensorlets. As an example, the gateway node can transmit information from a sensorlet to an aerial resource, such as an aircraft or a spacecraft. The aircraft or spacecraft can relay the information over great distances. To illustrate this point, a temporary wireless relay can be established, for example, via UAV or Aerostat Unmanned Aerial System (UAS) assets.

Another capability mesh networking among sensorlets can provide is to communicate to a plurality of other sensorlets information obtained by a sensorlet. As an example, sensorlets can communicate to each other the sensor information they each obtain, allowing processing at a sensorlet of more than the information obtained by that sensorlet alone. As examples, a sensorlet can corroborate and correlate the information it obtains from its sensors with sensor information obtained by other sensorlets. Accordingly, the distributed sensorlet system can collectively form a unified characterization based on sensor data from a plurality of sensorlets.

As described above, an aerial resource can be used to collect or relay information from one or more sensorlets, allowing sensor information from the one or more sensorlets to be processed at the aerial resource, at a remote site to which the sensor information is relayed via the aerial resource, or at both locations. The sensorlets can transmit information directly to the aerial resource, via a network, such as a mesh network among a plurality of sensorlets, or via a combination of direct transmission to the aerial resource and networked transmission to the aerial resource.

As a sensorlet can serve as both a source of sensor information and a network node, the status of the sensorlet as a source of information can be used in the determination of the status of the sensorlet as a network node, and the status of the sensorlet as a network node can be used in the determination of the status of the sensorlet as a source of information. As an example, if no sensor information originating from a sensorlet is seen for some time, the status of that sensorlet as a network node can be regarded as dubious, and proximate nodes of the network can query the sensorlet to determine if it is still a reliable network node. As another example, if a sensorlet is determined not to be a reliable network node, the status of the sensorlet as a source of sensor information can be regarded as dubious, and the processing of sensor information can be reconfigured to utilize sensor information from other sensorlets without reliance on sensor information from the sensorlet that is not a reliable network node. The integrity of the sensor information can be used to assure the integrity of the network, and the integrity of the network can be used to assure the integrity of the sensor information.

From the sensor information obtained from the plurality of sensorlets, one or more models may be built to characterize the combined sensor information. The one or more models can characterize the combined sensor information as being representative of one or more objects. As an example, temporal, spatial, and other relationships of the sensor information of the plurality of sensorlets can be used to build a model of one or more objects in time and space. As another example, attributes of the sensor information recognizable as relating to an event or activity can be used to build a model based on the sensor information of the plurality of sensorlets. The model building and processing of distributed sensor streams obtained from the plurality of sensorlets can synergistically provide a synthesized understanding of one or more objects beyond what would be possible based on the sensor data of a single sensorlet.

Machine learning can be applied to a sensor data analysis system. A machine learning based sensor data analysis system enables conversion of distributed sensor streams obtained from a plurality of sensorlets into usable insights with temporal, spatial, and event and activity based awareness. Exemplary applications include improvised explosive device (IED) detection, virtual perimeter enforcement, route intelligence and protection.

FIG. 1 is an elevation view diagram illustrating a distributed sensorlet system in accordance with at least one embodiment. Distributed sensorlet system 100 comprises a plurality of distributed sensorlets 104, 107, 110, 113, and 116. Distributed sensorlet system 100 can also comprise a communication platform 101 configured to communicate with one or more of the distributed sensorlets 104, 107, 110, 113, and 116. Communication platform 101 may be situated, for example, on a land vehicle, a vessel situated over water, an aerial platform, such as a balloon or an airship, or a structure situated at a fixed location. In accordance with at least one embodiment, communication platform 101 comprises a communication node 102 configured to communicate via antenna 103. As examples, communication platform 101 may be an aerostat UAS, a UAV, or another communication platform. Antenna 103 can be used, for example, to communicate with one or more of the plurality of sensorlets 104, 107, 110, 113, and 116. For example, antenna 103 can be used to communicate with several individual sensorlets, with a sensorlet serving as a gateway node for a network of sensorlets, with a non-sensorlet gateway node, with a combination of the foregoing, or with other nodes. As another example, antenna 103 can be used to communicate information, such as sensor information, tracking information, coordination information, and command information to or from sensorlets 104, 107, 110, 113, and 116. The ability to communicate the locations of sensorlets 104, 107, 110, 113, and 116 can be useful, for example, to correlate sensor information from sensorlets 104, 107, 110, 113, and 116 with the respective locations of sensorlets 104, 107, 110, 113, and 116.

Sensorlet 104 comprises sensor 105 and is equipped with antenna 106, sensorlet 107 comprises sensor 108 and is equipped with antenna 109, sensorlet 110 comprises sensor 111 and is equipped with antenna 112, sensorlet 113 comprises sensor 114 and is equipped with antenna 115, and sensorlet 116 comprises sensor 117 and is equipped with antenna 118. In the example illustrated in FIG. 1, communication node 102 communicates via its antenna 103 with sensorlet 104 via its antenna 106 along signal path 121 and sensorlet 107 via its antenna 109 along signal path 122. Sensorlet 104 communicates via its antenna 106 with sensorlet 110 via its antenna 112 along signal path 123. Sensorlet 107 communicates via its antenna 109 with sensorlet 113 via its antenna 115 along signal path 124 and with sensorlet 116 via its antenna 118 along signal path 125. Sensorlet 110 communicates via its antenna 112 with sensorlet 113 via its antenna 115 along signal path 126. Sensorlet 113 communicates via its antenna 115 with sensorlet 116 via its antenna 118 along signal path 127.

Multiple possible paths exist for communication, providing redundancy in case of loss of a signal path. As one example, sensorlet 110 can pass its sensor information along signal path 123 to sensorlet 104, which can relay the sensor information from sensorlet 110 via signal path 121 to communication node 102. However, if either of signals paths 121 and 123 are lost, sensorlet 110 can pass its sensor information along signal path 126 to sensorlet 113, which can relay the sensor information from sensorlet 110 via signal path 124 to sensorlet 107. Sensorlet 107 can relay the sensor information from sensorlet 110 via signal path 122 to communication node 102. If signal path 124 were also to fail, sensorlet 113 could relay the sensor information from sensorlet 110 along signal path 127 to sensorlet 116, which could relay the sensor information from sensorlet 110 along signal path 125 to sensorlet 107. Sensorlet 107 could relay the information from sensorlet 107 along signal path 122 to communication node 102. As can be seen, with the sensorlets 104, 107, 110, 113, and 116 and communication node 102 able to relay sensor information, multiple paths exist from any node to any other node in the network. Thus, according to the illustrated example, a robust, fault-tolerant network is provided for communication of sensor information from sensorlets 104, 107, 110, 113, and 116.

While a particular number of sensorlets and particular signal paths between certain ones of those sensorlets are illustrated, and only one communication node 102 is illustrated, embodiments may be practiced with other numbers of sensorlets, other numbers of communication nodes, and other numbers and configurations of signal paths, and the sensorlets, communication nodes, and signal paths may come and go dynamically over time yet reliable communication of sensor information can be maintained generally regardless of specific changes.

In accordance with at least one embodiment, sensorlets 104, 107, 110, 113, and 116 can be deployed from an aircraft, such as a UAV, an aerostat UAS, an airplane, or a helicopter. In accordance with at least one embodiment, sensorlets 104, 107, 110, 113, and 116 can be deployed using their own propulsion systems. In accordance with at least one embodiment, sensorlets 104, 107, 110, 113, and 116 can be deployed from the ground or from the surface of a body of water, for example, using a mortar or other launcher. In accordance with at least one embodiment, sensorlets 104, 107, 110, 113, and 116 can be deployed individually from a host platform such as those described above. In accordance with at least one embodiment, sensorlets 104, 107, 110, 113, and 116 can be deployed in a unitized form, such as within a unitized container, from a host platform, with the unitized container configured to open and release the individual sensorlets 104, 107, 110, 113, and 116.

As one example, distributed sensorlet system 100 may be maintained in a pre-deployment configuration, guided by communication with a peer network or a command and control system to deploy sensorlets upon command. As another example, distributed sensorlet system 100 can be maintained in a deployed configuration, with distributed sensorlet system 100 configured to have communication platform 101 communicate with deployed sensorlets. For example, the deployed configuration may be used to scout an area or provide surveillance for force protection purposes or target detection purposes.

Figure 2:
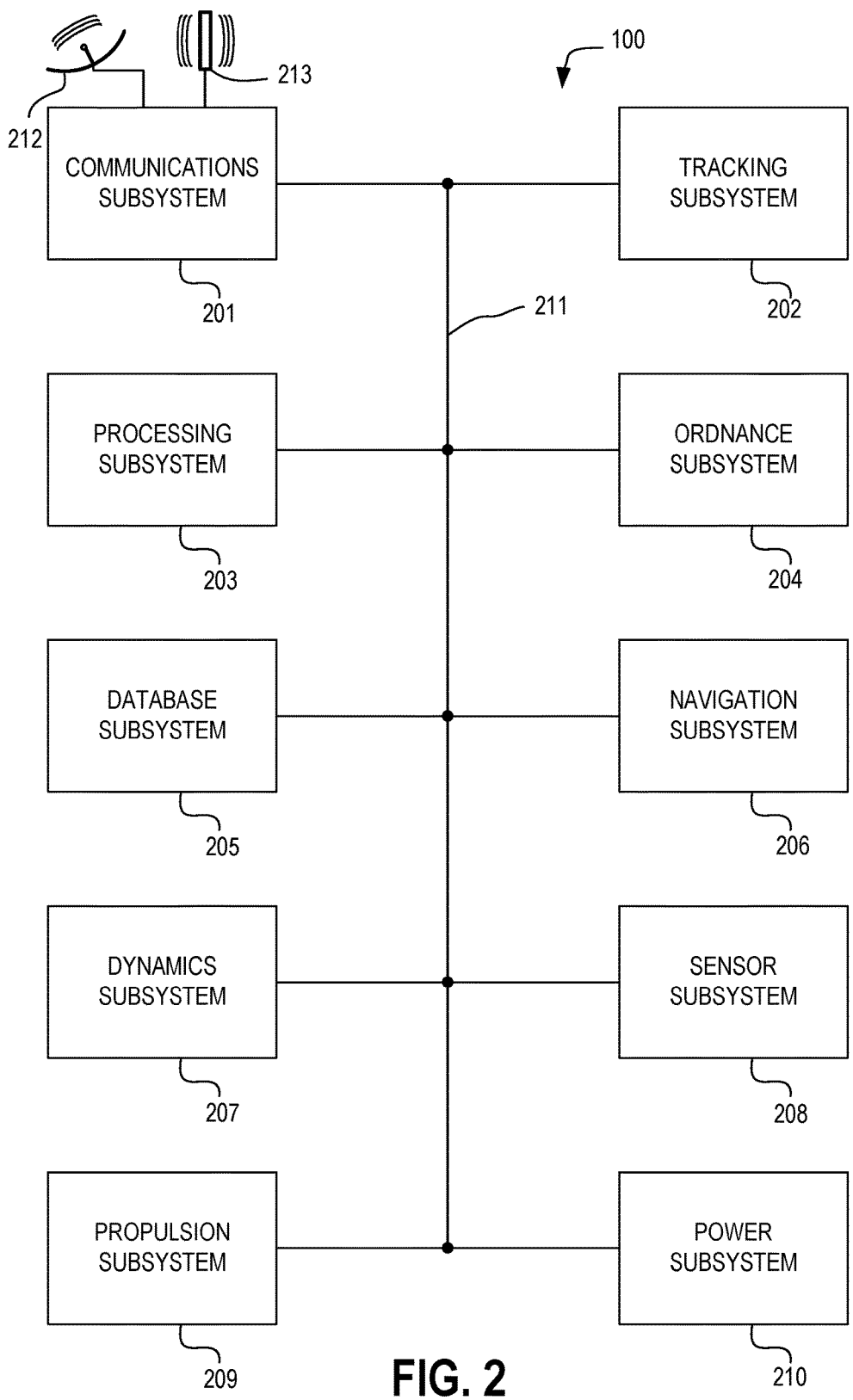
FIG. 2 is a block diagram illustrating a distributed sensorlet system in accordance with at least one embodiment.

FIG. 2 is a block diagram illustrating a distributed sensorlet system in accordance with at least one embodiment. Distributed sensorlet system 100 comprises communications subsystem 201, tracking subsystem 202, processing subsystem 203, ordnance subsystem 204, database subsystem 205, navigation subsystem 206, dynamics subsystem 207, sensor subsystem 208, propulsion subsystem 209, and power subsystem 210. Each of such subsystems is coupled to at least another of such subsystems. In the illustrated example, the subsystems are coupled to each other via interconnect 211. Communications subsystem 201 may be coupled to antennas, such as satellite antenna 212 and terrestrial antenna 213. Other embodiments may be implemented with a subset of the above subsystems or with additional subsystems beyond the above subsystems or a subset thereof.

The elements shown in FIG. 2 may, for example, be distributed among components of the distributed sensorlet system. As an example, one or more elements shown in FIG. 2 may be incorporated in one or more sensorlets, while another one or more elements may be incorporated in a host platform from which sensorlets may be deployed or from which a unitized container comprising sensorlets may be delivered, with the sensorlets being deployed from the unitized container. As another example, multiple instances of one or more elements shown in FIG. 2 may be provided, with one or more instances incorporated in one or more sensorlets and another one or more instances incorporated in a host platform. As may be desired, one or more elements shown in FIG. 2 may be omitted from the distributed sensorlet system, according to at least one embodiment.

Figure 3:
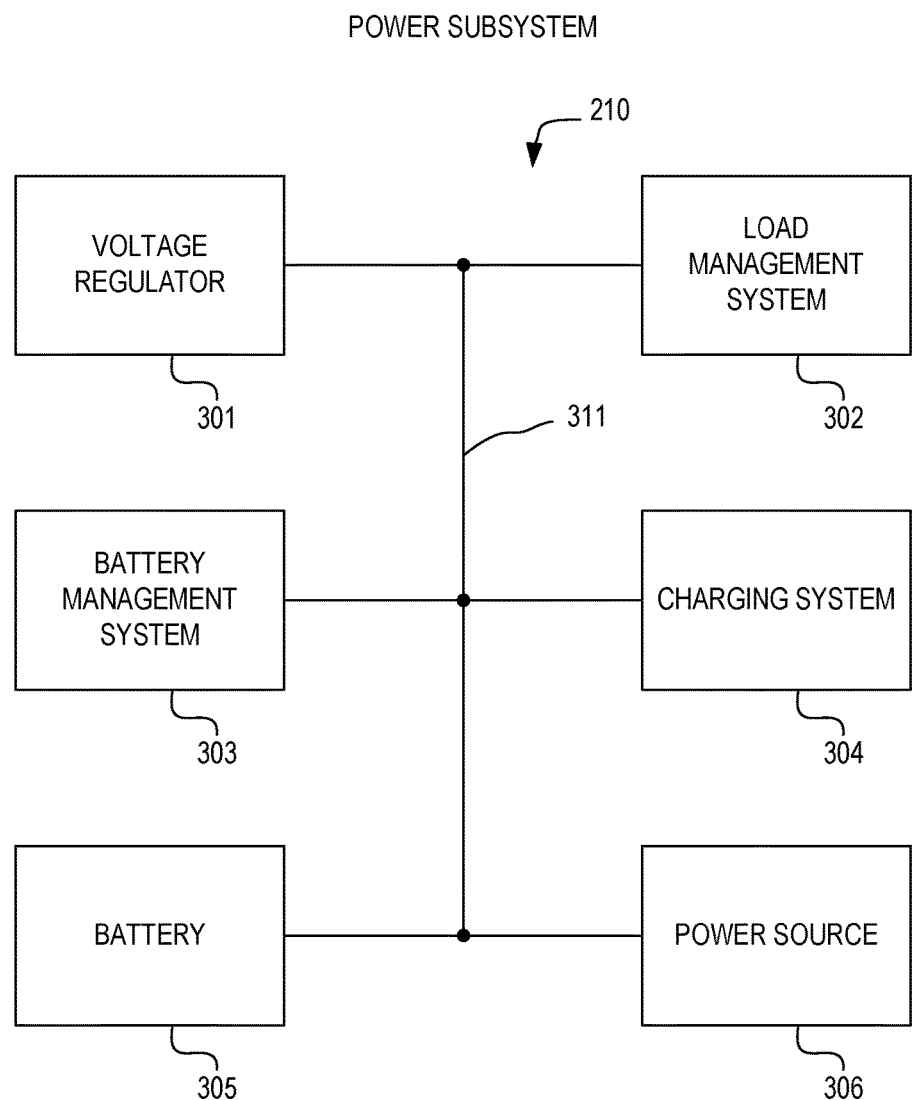
FIG. 3 is a block diagram illustrating a power subsystem of a distributed sensorlet system in accordance with at least one embodiment.

FIG. 3 is a block diagram illustrating a power subsystem of a distributed sensorlet system in accordance with at least one embodiment. Power subsystem 210 comprises voltage regulator 301, load management system 302, battery management system 303, charging system 304, battery 305, and power source 306. Each of such elements is coupled to at least another of such elements. In the illustrated example, the elements are coupled to each other via interconnect 311.

As examples, power source 306 can be a solar power source, a wind power source, a wave power source, a hydrothermal power source, a chemical fuel power source, a nuclear power source, or another type of power source. As an example, a host platform can provide power source 306. Power from power source 306 may be provided to the distributed sensorlet system via an electrical connector and an electrical conduit, as an example. Charging system 304 can be configured to charge battery 305 using power obtained from power source 306. Battery management system can manage a battery state of battery 305 and can monitor charging and discharging of battery 305. Load management system 302 can monitor power used by loads, such as other subsystems shown in FIG. 2. Voltage regulator 301 can provide one or more regulated voltages to the loads.

Figure 4:
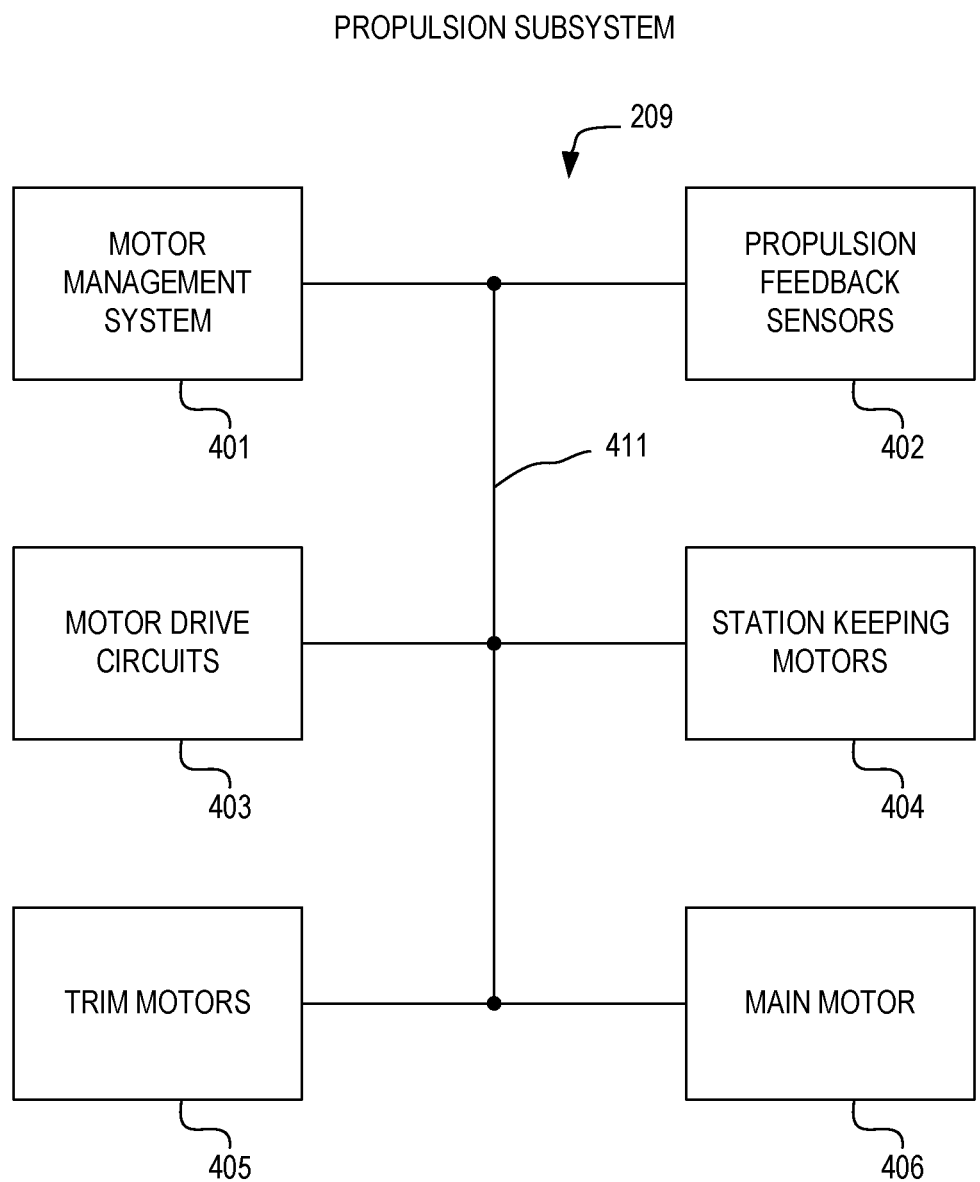
FIG. 4 is a block diagram illustrating a propulsion subsystem of a distributed sensorlet system in accordance with at least one embodiment.

FIG. 4 is a block diagram illustrating a propulsion subsystem of a distributed sensorlet system in accordance with at least one embodiment. Propulsion subsystem 209 comprises motor management system 401, propulsion feedback sensors 402, motor drive circuits 403, station keeping motors 404, trim motors 405, and main motor 406. Each of such elements is coupled to at least another of such elements. In the illustrated example, the elements are coupled to each other via interconnect 411.

Main motor 406 can provide main propulsion of distributed sensorlet system 100. Such main propulsion can allow one or more components of distributed sensorlet system 100 to move to a deployment location. Such main propulsion can also allow one or more components of distributed sensorlet system 100 to move in relation to other objects, such as other instances of distributed sensorlet system 100. Trim motors 405 can provide propulsive force to counteract force that would change the orientation of distributed sensorlet system 100 away from a desired orientation. As examples, trim motors 405 can compensate for forces that would tend to impart undesired pitch, yaw, and roll to distributed sensorlet system 100. Station keeping motors 404 can provide propulsive force to counteract currents that would cause distributed sensorlet system 100 to drift away from its deployment location. As examples, station keeping motors 404 can be oriented along a plurality of axes, such as x, y, and z orthogonal axes, to allow station keeping in three dimensions. Motor drive circuits 403 are coupled to main motor 406, trim motors 405, and station keeping motors 404 to provide electrical motor drive signals to drive such motors. Power for the electrical motor drive signals can be obtained from power subsystem 210. Propulsion feedback sensors 402 can monitor the propulsion provided by the motors of propulsion subsystem 209. As an example, propulsion feedback sensors 402 can include pressure sensors to measure pressures produced by movement of water by propulsion system elements. As another example, propulsion feedback sensors 402 can include accelerometers to measure acceleration provided by propulsion system elements. Motor management system 401 can use information from propulsion feedback sensors 402 to cause motor drive circuits 403 to drive main motor 406, trim motors 405, and station keeping motors 404 to provide desired propulsion.

Figure 5:
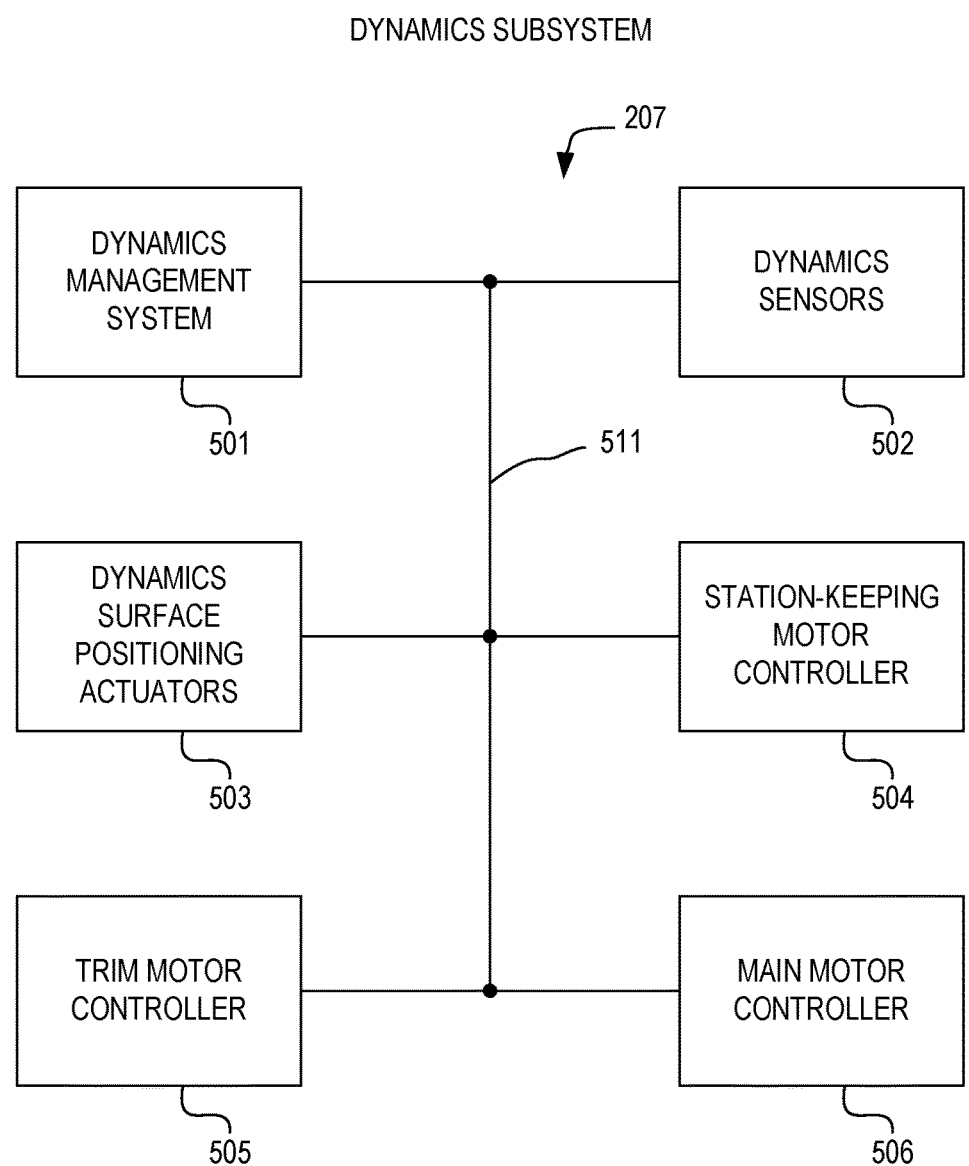
FIG. 5 is a block diagram illustrating a dynamics subsystem of a distributed sensorlet system in accordance with at least one embodiment.

FIG. 5 is a block diagram illustrating a dynamics subsystem of a distributed sensorlet system in accordance with at least one embodiment. Dynamics subsystem 207 comprises dynamics management system 501, dynamics sensors 502, dynamics surface positioning actuators 503, station-keeping motor controller 504, trim motor controller 505, and main motor controller 506. Each of such elements is coupled to at least another of such elements. In the illustrated example, the elements are coupled to each other via interconnect 511.

Dynamics sensors 502 sense dynamic forces and responsiveness of distributed sensorlet system 100 to such dynamic forces. Examples of dynamic sensors 502 include pressure sensors, strain gauges, and fluid dynamics sensors. Dynamics management system 501 uses the sensed data from dynamics sensors 502 to provide dynamics control signals to dynamics surface positioning actuators 503, to main motor controller 506, to trim motor controller 505, and to station-keeping motor controller 504. Dynamics surface positioning actuators 503 can comprise, for example, actuators to orient aerodynamic surfaces of distributed sensorlet system 100 to adjust the responsiveness of distributed sensorlet system 100 to aerodynamic forces exerted upon it. Main motor controller 506, trim motor controller 505, and station-keeping motor controller 504 can provide dynamics control signals to adjust the operation of main motor 406, trim motors 405, and station keeping motors 404, respectively, as dictated by dynamics management system 501 in response to dynamics sensor data from dynamics sensors 502.

Figure 6:
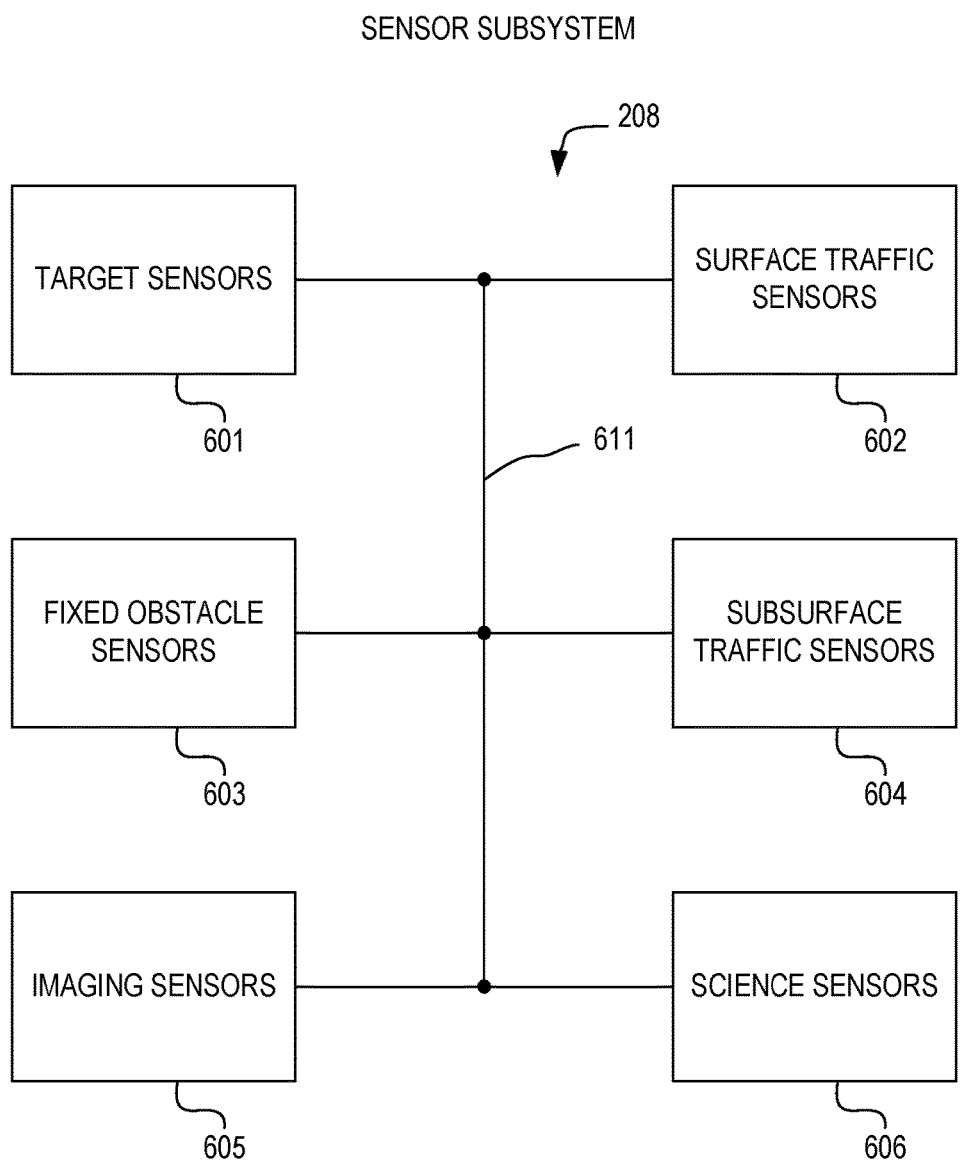
FIG. 6 is a block diagram illustrating a sensor subsystem of a distributed sensorlet system in accordance with at least one embodiment.

FIG. 6 is a block diagram illustrating a sensor subsystem of a distributed sensorlet system in accordance with at least one embodiment. Sensor subsystem 208 comprises target sensors 601, surface traffic sensors 602, fixed obstacle sensors 603, subsurface traffic sensors 604, imaging sensors 605, and science sensors 606. Each of such elements is coupled to at least another of such elements. In the illustrated example, the elements are coupled to each other via interconnect 611.

Target sensors 601 include sensors suitable for sensing a target suitable for engagement with ordnance subsystem 204 of distributed sensorlet system 100. Examples of target sensors 601 include a monostatic radar, a bistatic radar receiver, a bistatic radar transmitter, an infrared sensor, and a passive acoustic sensor. Surface traffic sensors 602 include sensors suitable for sensing traffic of surface vessels on a surface of water in which distributed sensorlet system 100 may operate. Examples of surface traffic sensors 602 include a monostatic radar, a bistatic radar receiver, a bistatic radar transmitter, an infrared sensor, an active acoustic sensor, and a passive acoustic sensor. Fixed obstacle sensors 603 include sensors suitable for sensing fixed obstacles. Examples of fixed obstacle sensors 603 include a monostatic radar, a bistatic radar receiver, a bistatic radar transmitter, an infrared sensor, an active acoustic sensor, a passive acoustic sensor, and a depth profiler. Subsurface traffic sensors 604 include sensors suitable for sensing traffic of subsurface vessels below a surface of water in which distributed sensorlet system 100 operates. Examples of subsurface traffic sensors 604 include an active acoustic sensor, a passive acoustic sensor, and a magnetic sensor. The magnetic sensor may include, for example, a magnetometer or a magnetic anomaly detector. Imaging sensors 605 include sensors capable of obtaining images. Examples of imaging sensors 605 include visible still cameras, visible video cameras, infrared cameras, ultraviolet cameras, star tracking cameras, and other cameras. While sensors may be incorporated in a sensorlet, at least one sensor may be separable from a sensorlet. As an example, one or more sensorlets may be configured to release a separable sensor package, such as a buoy or a ground-based sensor package. As an example, the separable sensor package may provide sensing based on a physical connection with a medium, such as water or earth, through which detectable signals may propagate. Accordingly, as examples, acoustic, magnetic, seismic, and other sensors may be separably deployed by one or more sensorlets.

Imaging sensors 605 can comprise sensors such as side scan sonar (SSS), synthetic aperture sonar (SAS), multibeam echosounders (MBES), imaging sonar, sub-bottom profiler (SBP), video cameras, still cameras, infrared cameras, multispectral cameras, and other types of imaging sensors. Science sensors 606 can comprise sensors such as conductivity, temperature, and depth (CTD) sensors, conductivity and temperature (CT) sensors, fluorometers, turbidity sensors, sound velocity sensors, beam attenuation meters, scattering meters, transmissometers, and magnetometers.

Figure 7:
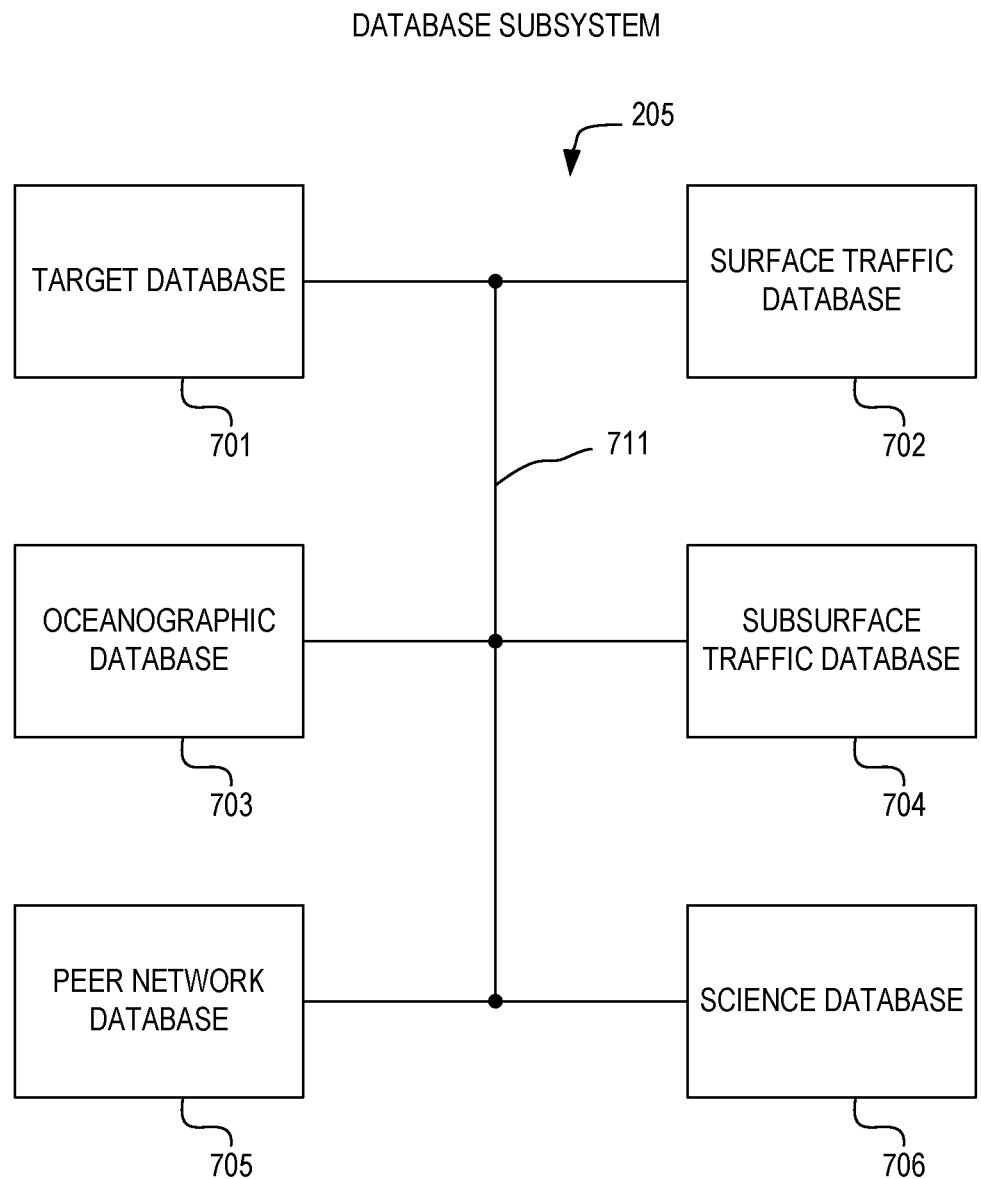
FIG. 7 is a block diagram illustrating a database subsystem of a distributed sensorlet system in accordance with at least one embodiment.

FIG. 7 is a block diagram illustrating a database subsystem of a distributed sensorlet system in accordance with at least one embodiment. Database subsystem 205 comprises target database 701, surface traffic database 702, oceanographic database 703, subsurface traffic database 704, peer network database 705, and science database 706. Each of such elements is coupled to at least another of such elements. In the illustrated example, the elements are coupled to each other via interconnect 711.

Target database 701 is a database for storing information characterizing potential targets and other information useful for distinguishing non-targets from targets. As examples, target database 701 may include information such as identification friend or foe (IFF) information, radar signature information, infrared signature information, and acoustic signature information as may pertain to aircraft. Surface traffic database 702 is a database for storing information characterizing potential surface traffic. As examples, surface traffic database 702 may include information such as radar signature information, infrared signature information, and acoustic signature information as may pertain to surface vessels. Oceanographic database 703 is a database for storing information characterizing physical features of the operating environment, such as an ocean, of distributed sensorlet system 100. As examples, oceanographic database 703 may include information as to ocean floor topography, ocean currents, islands, coastlines, and other features. Subsurface traffic database 704 is a database for storing information characterizing potential subsurface traffic. As examples, subsurface traffic database 704 may include information such as acoustic signature information as may pertain to subsurface vessels. Peer network database 705 is a database for storing information characterizing a relationship of distributed sensorlet system 100 to other instances of distributed sensorlet system 100 capable of operating cooperatively as peers with distributed sensorlet system 100. As examples, subsurface traffic database 704 may include information as to locations of peers, sensor parameters of peers, ordnance capabilities of peers, readiness of peers, and other properties of peers. Science database 706 is a database for storing information of a scientific nature, such as water temperature, water salinity, water conductivity, water density, water turbidity, air temperature, barometric pressure, sky conditions, and other information descriptive of conditions of the environment within which distributed sensorlet system 100 operates.

Figure 8:
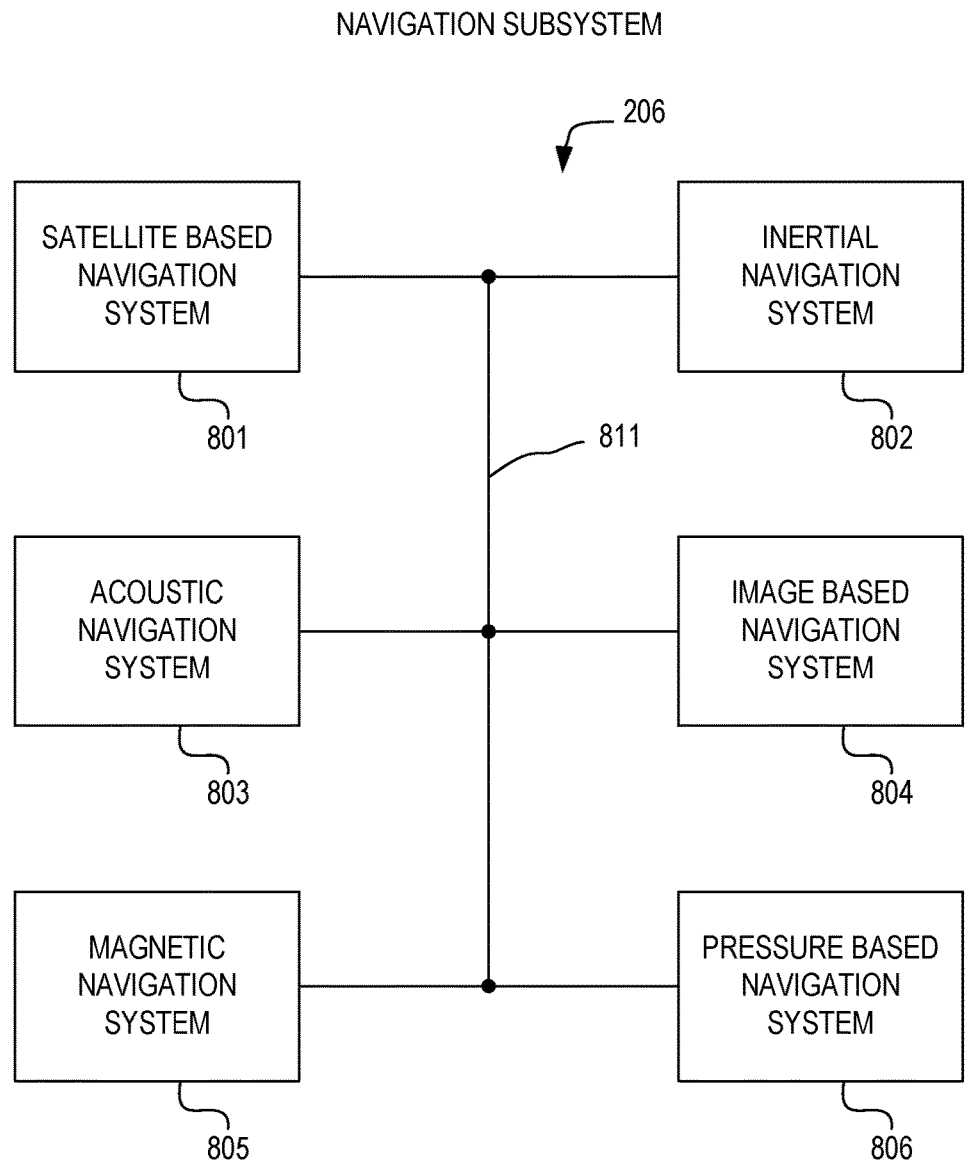
FIG. 8 is a block diagram illustrating a navigation subsystem of a distributed sensorlet system in accordance with at least one embodiment.

FIG. 8 is a block diagram illustrating a navigation subsystem of a distributed sensorlet system in accordance with at least one embodiment. Navigation subsystem 206 comprises satellite based navigation system 801, inertial navigation system 802, acoustic navigation system 803, image based navigation system 804, magnetic navigation system 805, and pressure based navigation system 806. Each of such elements is coupled to at least another of such elements. In the illustrated example, the elements are coupled to each other via interconnect 811.

Satellite based navigation system 801 can comprise, for example, a Global Navigation Satellite System (GLONASS) receiver and a Global Positioning System (GPS) receiver, which may include a Selective Availability/Anti-Spoofing Module (SAASM), a precise pseudo-random code (P-code) module, and an encrypted precise pseudo-random code (Y-code) module. Inertial navigation system 802 can comprise an inertial navigation sensor (INS) and an inertial measurement unit (IMU), which can comprise at least one of an accelerometer, a gyroscope, and a magnetometer.

Acoustic navigation system 803 can comprise, for example, Ultra Short Baseline (USBL) system, Long Baseline (LBL) system, a Doppler Velocity Logger (DVL), and an acoustic tracking transponder. Magnetic navigation system 805 can comprise, for example, a compass. Pressure based navigation system 806 can comprise, for example, an altimeter and a pressure sensor.

Figure 9:
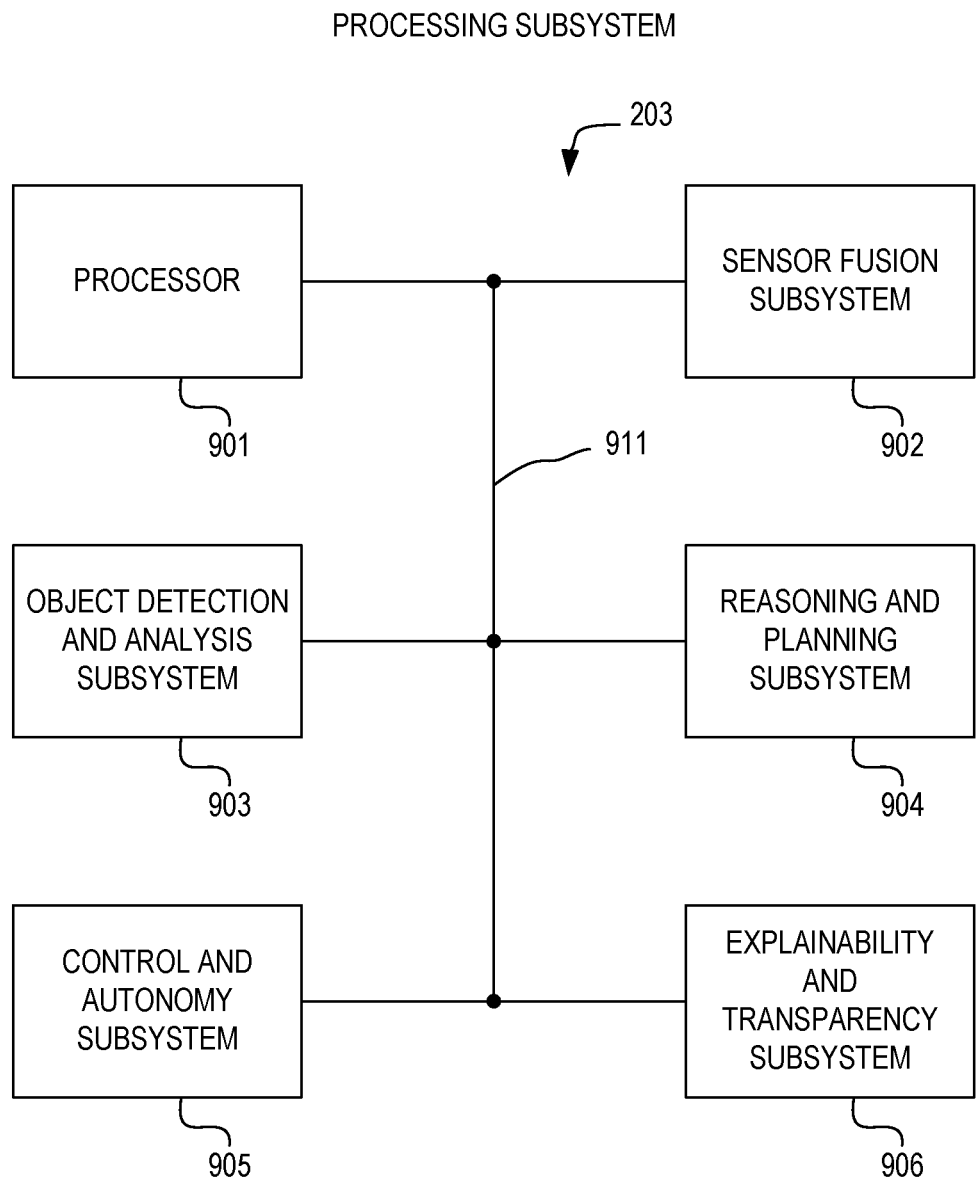
FIG. 9 is a block diagram illustrating a processing subsystem of a distributed sensorlet system in accordance with at least one embodiment.

FIG. 9 is a block diagram illustrating a processing subsystem of a distributed sensorlet system in accordance with at least one embodiment. Processing subsystem 203 comprises processor 901, sensor fusion subsystem 902, object detection and analysis subsystem 903, reasoning and planning subsystem 904, control and autonomy subsystem 905, and explainability and transparency subsystem 906. Each of such elements is coupled to at least another of such elements. In the illustrated example, the elements are coupled to each other via interconnect 911.

Processor 901 is a data processor for processing information within distributed sensorlet system 100. Processor 901 can cooperate with subsystems of processing subsystem 203, such as sensor fusion subsystem 902, object detection and analysis subsystem 903, reasoning and planning subsystem 904, control and autonomy subsystem 905, and explainability and transparency subsystem 906. As one example, processing subsystem 203 can be implemented to utilize heterogeneous computing, wherein the different elements of processing subsystem 203 are implemented using different configurations of processor circuits, in accordance with at least one embodiment. As another example, a homogeneous computing system comprising similar configurations of processor circuits, such as a symmetric multiprocessor (SMP) system, can be used to implement processing subsystem 203.

Sensor fusion subsystem 902 processes sensor data obtained by sensors, such as sensors of sensor subsystem 208. Sensor data can be obtained from sensors local to distributed sensorlet system 100 or from remote sensors located elsewhere, for example, on other instances of distributed sensorlet system 100, on other vessels, or on other platforms, such as satellites, aircraft, or fixed locations. Sensor fusion subsystem 902 provides fidelity enhancement with multi-sensor feeds. As an example, sensor fusion subsystem 902 compares sensor data from multiple sensors to cross-validate the sensor data. The sensor data being cross-validated can be homogeneous, having been obtained from different instances of a similar type of sensor, can be heterogeneous, having been obtained from different types of sensors, or can have homogeneous and heterogeneous aspects, having been obtained from different instances of a similar type of sensor for each of a plurality of different types of sensors.

Sensor fusion subsystem 902 provides noise reduction and bad data identification via deep artificial neural networks (ANNs). Deep artificial neural networks are configured to recognize spurious data that, if relied upon, could lead to improper decision making. The deep artificial neural networks can acquire knowledge that can be stored within the adaptive elements of the deep artificial neural networks, and that acquired knowledge can be used for subsequent decision making. As an example, as a wide range of sensor data is obtained over time, sensor fusion subsystem 902 can learn to distinguish between, as examples, civilian aircraft, friendly military aircraft, and hostile military aircraft.

Sensor fusion subsystem 902 provides automated feature construction and evolution. By processing sensor data to identify features of a potential target that can be recognized from the information provided by the sensor data and adaptively modifying the processing of the sensor data over time to improve the identification of such features, feature recognition provided by sensor fusion subsystem 902 can improve identification of actual targets from among potential targets.

Sensor fusion subsystem 902 can combine augmented reality (AR) with virtual reality (VR) and predictive algorithms to facilitate application of information obtained from sensors to create an easily comprehensible presentation of a situation. For example, sensor fusion subsystem 902 can effectively filter out extraneous information, such as weather conditions and countermeasure effects, to provide a clear presentation of a target. The presentation of the target can be made with respect to distributed sensorlet system 100, for example, with respect to the engagement range of the ordnance of ordnance subsystem 204 of distributed sensorlet system 100.

Object detection and analysis subsystem 903 utilizes machine vision techniques to process sensor data to recognize an object the sensor data represents. Object detection and analysis subsystem 903 provides multi-spectral, cross-sensor analysis of sensor data, correlating sensor data of different types and of different sensors to assemble an accurate characterization of a detected object. Object detection and analysis subsystem 903 can perform new object discovery, utilizing unsupervised learning, which can identify the presence of new types of objects not previously known to exist or not previously having been identifiable based on previous processing of sensor data. Object detection and analysis subsystem 903 can provide a comprehensive vision of detectable objects and can apply ontologies to characterize such objects and their potential significance in a battlespace.

Reasoning and planning subsystem 904 can apply strategy generation techniques and strategy adaptation techniques to develop and adapt a strategy for protecting distributed sensorlet system 100 and other assets in concert with which distributed sensorlet system 100 may be deployed, for example, other instances of distributed sensorlet system 100 and naval vessels that may be protected by distributed sensorlet system 100. Reasoning and planning subsystem 904 can apply reality vectors to provide a thought-vector-like treatment of a real state of distributed sensorlet system 100 and its surroundings. Reasoning and planning subsystem 904 can apply reinforcement learning and evolutionary processes to accumulate knowledge during the course of its operation.

Control and autonomy subsystem 905 utilizes platforms to transform a large amount of data into situational awareness. For example, control and autonomy subsystem 905 can utilize simulation engines to transform data, such as sensor data and object information obtained from sensor data, into an understanding of the situation faced by distributed sensorlet system 100 that allows control and autonomy subsystem 905 to initiate action, such as engagement of a target using the ordnance of ordnance subsystem 204. Control and autonomy subsystem 905 can utilize reinforcement learning applications to evolve controllers, which can be used to autonomously control distributed sensorlet system 100. Control and autonomy subsystem 905 can utilize swarm constrained deep learning for distributed decision making.

Control and autonomy subsystem 905 can coordinate deployment of sensorlets, for example, to create desired distribution of deployed sensorlets. Sensorlet features such as a gliding airfoil or a propulsion system can be used to achieve the desired distribution. As an example, the deployment parameters can be selected to provide an evenly spaced distribution of sensorlets. As another example, the deployment parameters can be selected to provide a weighted distribution of sensorlets. The weighted distribution can have a greater density of sensorlets over an area of particular interest and a lesser density of sensorlets over another area of more general interest.

Control and autonomy subsystem 905 can interact with other subsystems, such as sensor subsystem 208 and tracking subsystem 202 to adaptively control the operation of the sensorlets via communications subsystem 201.

Explainability and transparency subsystem 906 can perform analysis and observation by applying natural language processing (NLP) and natural language generation (NLG) to produce natural language reports. Explainability and transparency subsystem 906 can perform hypothesis validation, enabling autonomous research to be performed by distributed sensorlet system 100. Explainability and transparency subsystem 906 can perform automated ontology discovery, allowing distributed sensorlet system 100 to recognize and respond to threats that do not fit within an existing knowledge base of threats.

Figure 10:
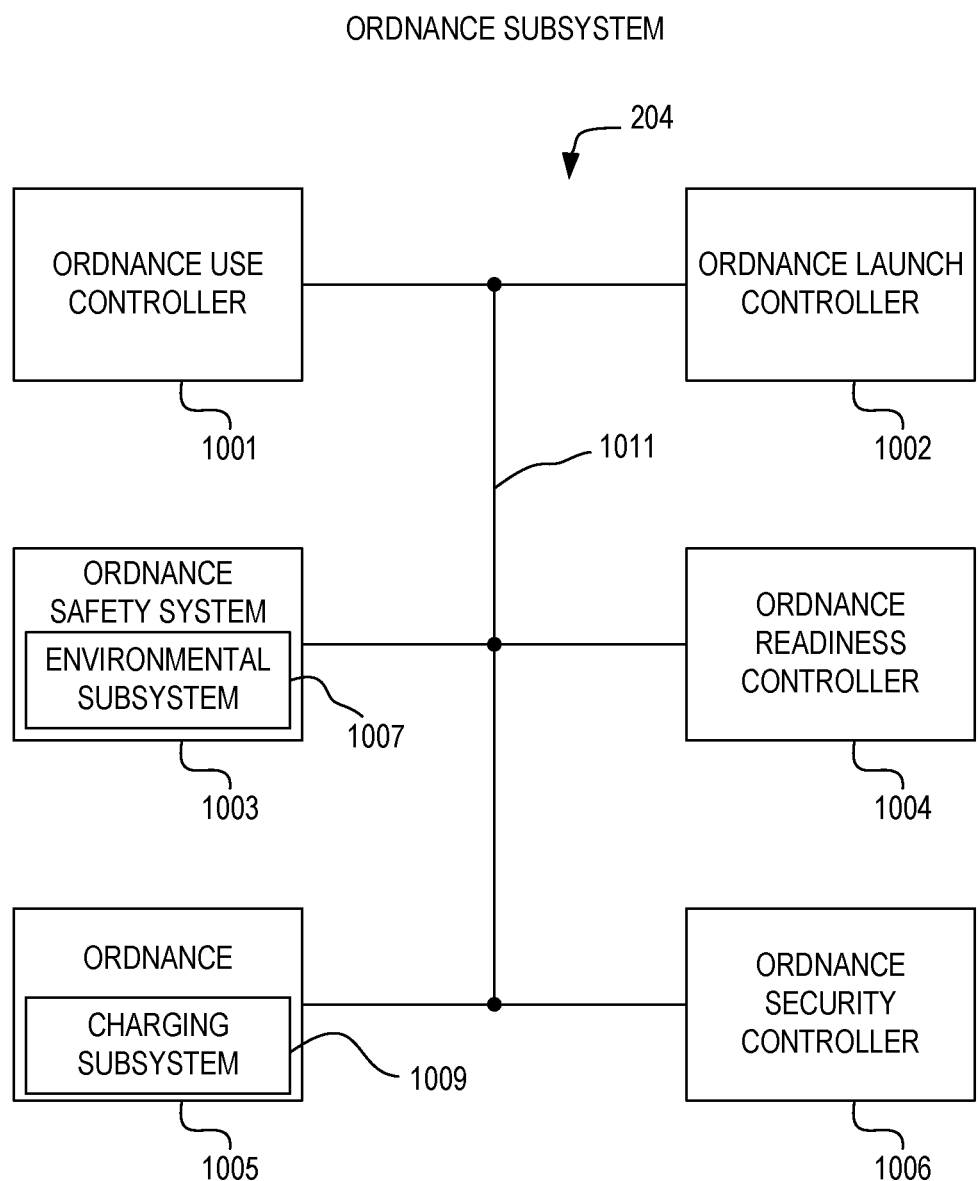
FIG. 10 is a block diagram illustrating an ordnance subsystem of a distributed sensorlet system in accordance with at least one embodiment.

FIG. 10 is a block diagram illustrating an ordnance subsystem of a distributed sensorlet system in accordance with at least one embodiment. Ordnance subsystem 204 comprises ordnance use controller 1001, ordnance launch controller 1002, ordnance safety system 1003, ordnance readiness controller 1004, ordnance 1005, and ordnance security controller 1006. Each of such elements is coupled to at least another of such elements. In the illustrated example, the elements are coupled to each other via interconnect 1011. Ordnance safety system 1003 comprises environmental subsystem 1007.

Ordnance 1005 may, for example, be a sensorlet carrying an explosive payload. For example, the explosive payload may comprise an explosive charge in an unprefragmented housing, an explosive charge in a prefragmented housing, thermobaric explosive payload, an electromagnetic explosive payload, or another type of explosive payload. Ordnance 1005 may comprise a charging subsystem 1009, which may, for example, cooperate with power subsystem 210 to allow charging (and subsequent recharging) of ordnance 1005. As an example, ordnance 1005 in the form of a sensorlet can include a rechargeable battery to power a propulsion system, such as a propeller system. Charging subsystem 1009 can charge the rechargeable battery of the sensorlet. The sensorlet can be deployed on multiple sorties, being recharged from time to time to continue to power the propulsion system over the multiple sorties. The rechargeable battery of the sensorlet can also power other systems of the sensorlet besides the propulsion system.

Ordnance security controller 1006 can operate to maintain security of ordnance 1005. As an example, ordnance security controller 1006 can be configured to detect tampering with distributed sensorlet system 100 that poses a security risk to ordnance 1005. Ordnance security controller 1006 can be configured, for example, to temporarily or permanently disable ordnance 1005 in response to a detected security risk.

Ordnance safety system 1003 can monitor conditions affecting safety of ordnance 1005. As an example, ordnance safety system 1003 can include environmental subsystem 1007. Environmental subsystem 1007 can monitor environmental conditions to which ordnance 1005 is exposed. Based on the monitored environmental conditions, ordnance safety system 1003 can determine whether the safety of ordnance 1005 has been compromised. In the event of the safety has been compromised, ordnance safety system 1003 can communicate a warning to other components of ordnance subsystem 204, such as to ordnance readiness controller 1004, ordnance use controller 1001, and ordnance launch controller 1002 to warn of potential safety risks concerning ordnance 1005. The other components can perform risk mitigation actions, such as inhibiting launch of ordnance 1005, rendering ordnance 1005 inert, or jettisoning ordnance 1005. The jettison process can be coordinated with other subsystems, such navigation subsystem 206, sensor subsystem 208, and database subsystem 205, to command self-destruction of ordnance 1005 after ordnance 1005 has been jettisoned to a safe location.

Ordnance readiness controller 1004 manages readiness of ordnance 1005 for use. Ordnance readiness controller 1004 can receive ordnance security information from ordnance security controller 1006, ordnance safety information from ordnance safety system 1003, and ordnance self-test information from ordnance 1005. Ordnance readiness controller 1004 can use such information to determine an overall readiness of ordnance 1005 for use.

Ordnance use controller 1001 manages confirmation of authority to use ordnance 1005. For example, ordnance use controller can receive a message via communications subsystem 201, which may have been decrypted via cryptographic system 1106, to authorize the use of ordnance 1005 or alternatively, to delegate the authority to use ordnance 1005 to processing subsystem 203, allowing distributed sensorlet system 100 to use ordnance 1005 autonomously.

Ordnance launch controller 1002 controls a launch sequence of ordnance 1005 when ordnance use controller 1001 has confirmed authority to use ordnance 1005. Ordnance launch controller 1002 monitors conditions for a safe launch of ordnance 1005 and is able to inhibit launch when such conditions are not met and to proceed with launch when such conditions are met.

Figure 11:
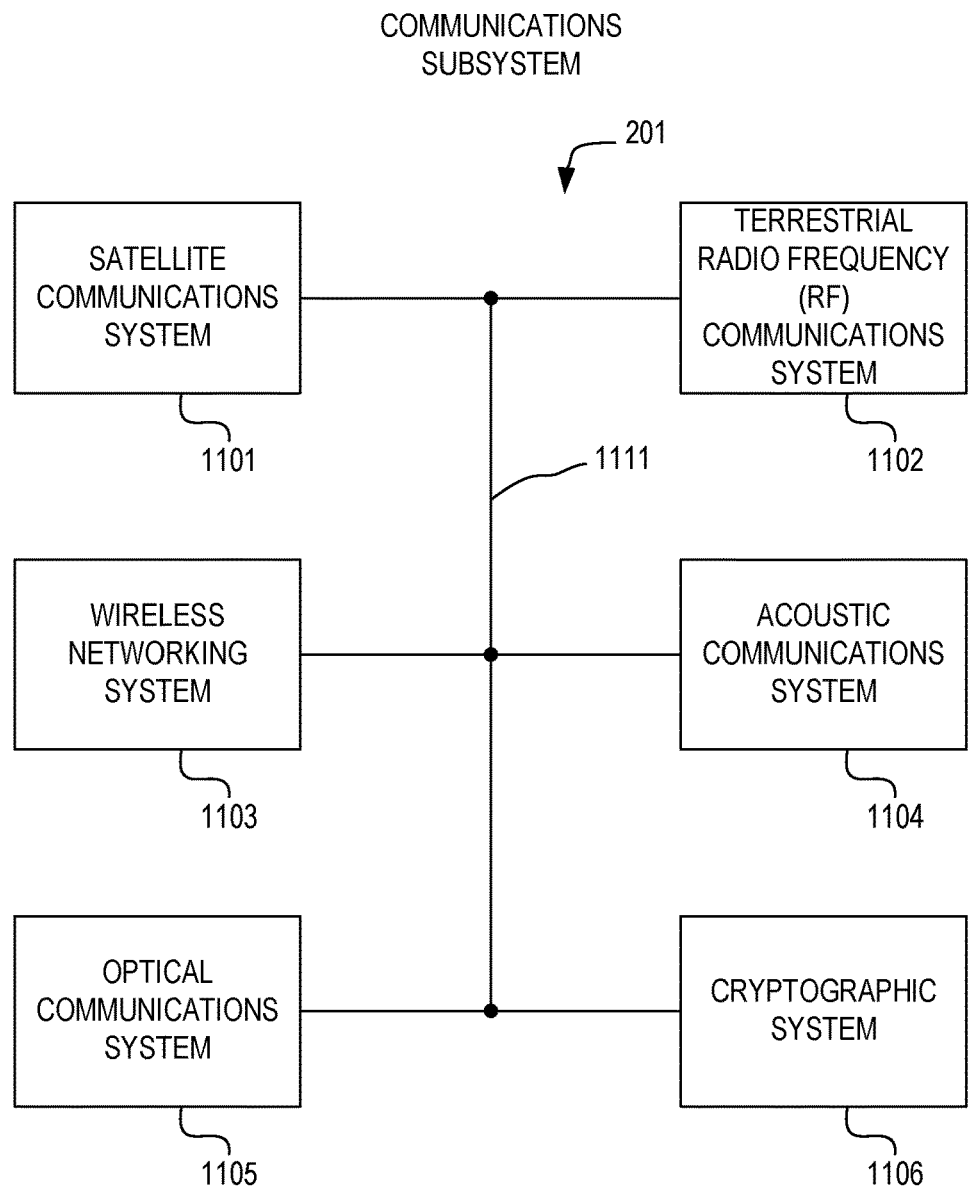
FIG. 11 is a block diagram illustrating a communications subsystem of a distributed sensorlet system in accordance with at least one embodiment.

FIG. 11 is a block diagram illustrating a communications subsystem of a distributed sensorlet system in accordance with at least one embodiment. Communications subsystem 201 comprises satellite communications system 1101, terrestrial radio frequency (RF) communications system 1102, wireless networking system 1103, acoustic communications system 1104, optical communications system 1105, and cryptographic system 1106. Each of such elements is coupled to at least another of such elements. In the illustrated example, the elements are coupled to each other via interconnect 1111.

Satellite communications system 1101 can comprise, for example, a Fleet Satellite Communications System (FLT-SATCOM) transceiver, an Ultra High Frequency (UHF) Follow-On (UFO) transceiver, a Mobile User Objective System (MUOS) transceiver, and a commercial satellite transceiver, such as an IRIDIUM satellite transceiver. Terrestrial RF communications system 1102 can comprise, for example, a terrestrial RF modem operating on one or more bands, such as a High Frequency (HF) band, a Very High Frequency (VHF) band, an Ultra High Frequency (UHF) band, and a microwave (μwave) band. Wireless networking system 1103 can comprise a WIFI wireless network transceiver (WIFI is a registered trademark of Wi-Fi Alliance), a BLUETOOTH wireless network transceiver (BLUETOOTH is a registered trademark of Bluetooth SIG, Inc.), a WIGIG wireless network transceiver (WIGIG is a registered trademark of Wi-Fi Alliance), and another type of wireless network transceiver. Acoustic communications system 1104 can comprise an acoustic modem. Optical communications system 1105 may comprise, for example, a blue/green laser communications system.

Communications subsystem 201 can communicate, for example, with a plurality of UAVs deployed by distributed sensorlet system 100. As an example, communications subsystem 201 can use wireless networking system 1103 to create a communications network with the plurality of UAVs. As one example, such as communications network can be a mesh network, wherein the plurality of UAVs can relay messages amongst themselves to extend the networking range. The relayed messages may originate, for example, from distributed sensorlet system 100 or from one of the plurality of UAVs. The relayed messages may be destined, for example, for distributed sensorlet system 100 or one of the plurality of UAVs.

Figure 12:
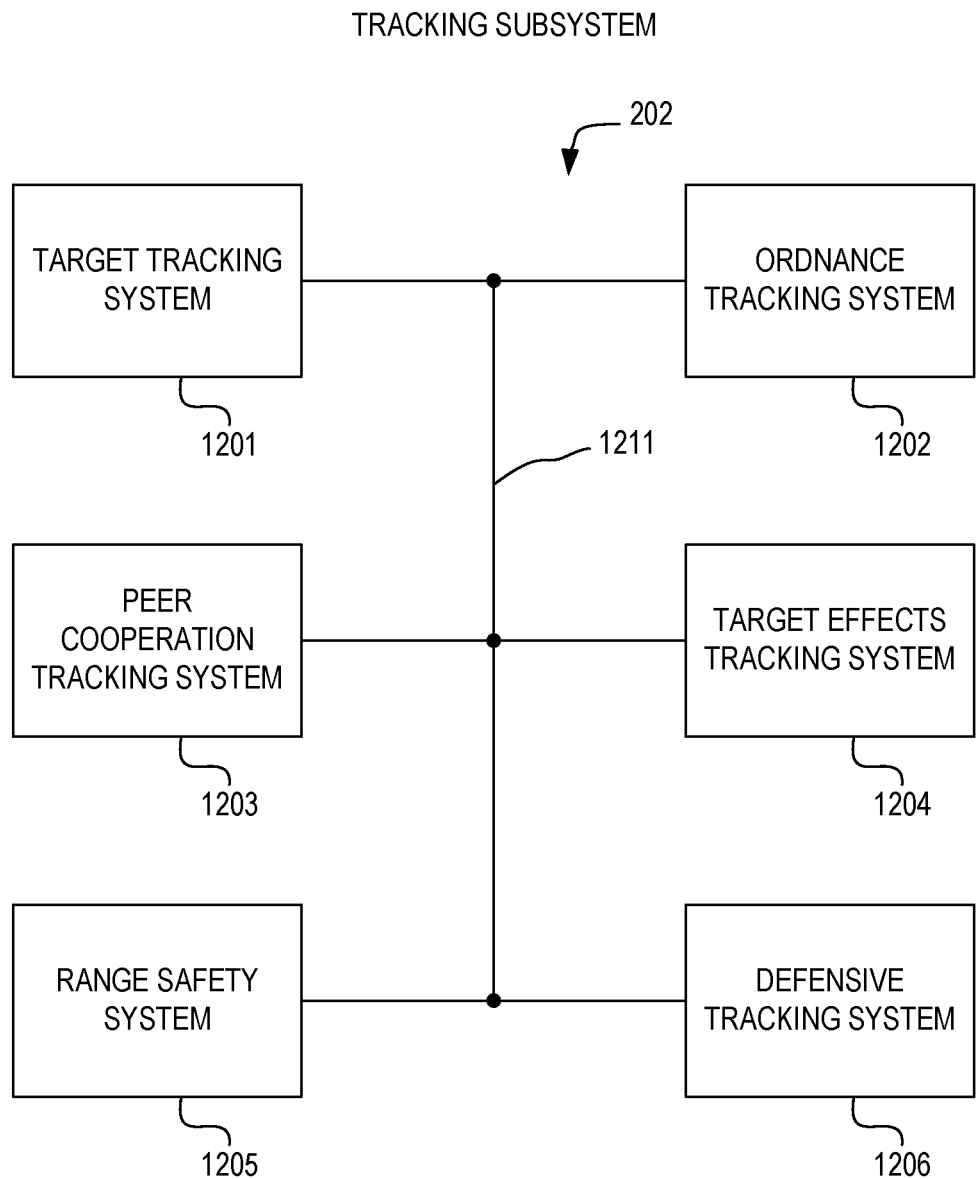
FIG. 12 is a block diagram illustrating a tracking subsystem of a distributed sensorlet system in accordance with at least one embodiment.

FIG. 12 is a block diagram illustrating a tracking subsystem of a distributed sensorlet system in accordance with at least one embodiment. Tracking subsystem 202 comprises target tracking system 1201, ordnance tracking system 1202, peer cooperation tracking system 1203, target effects tracking system 1204, range safety system 1205, and defensive tracking system 1206. Each of such elements is coupled to at least another of such elements. In the illustrated example, the elements are coupled to each other via interconnect 1211.

Target tracking system 1201 provides an ability to track a target acquired by sensor subsystem 208. Peer cooperation tracking system 1203 provides an ability to cooperate with the tracking subsystems of other instances of distributed sensorlet system 100, allowing such other instances to act as peers in tracking. Defensive tracking system 1206 allows distributed sensorlet system 100 to track threats against itself. Ordnance tracking system 1202 tracks ordnance 1005 after ordnance 1005 is launched to engage a target. Target effects tracking system 1204 tracks the effects of ordnance 1005 on the target. Range safety system 1205 obtains ordnance trajectory information as to the trajectory of ordnance 1005, for example, from ordnance tracking system 1202. Range safety system 1205 can take protective action, for example, commanding destruction of ordnance 1005, if ordnance 1005 fails to maintain its intended trajectory.

Figure 13:
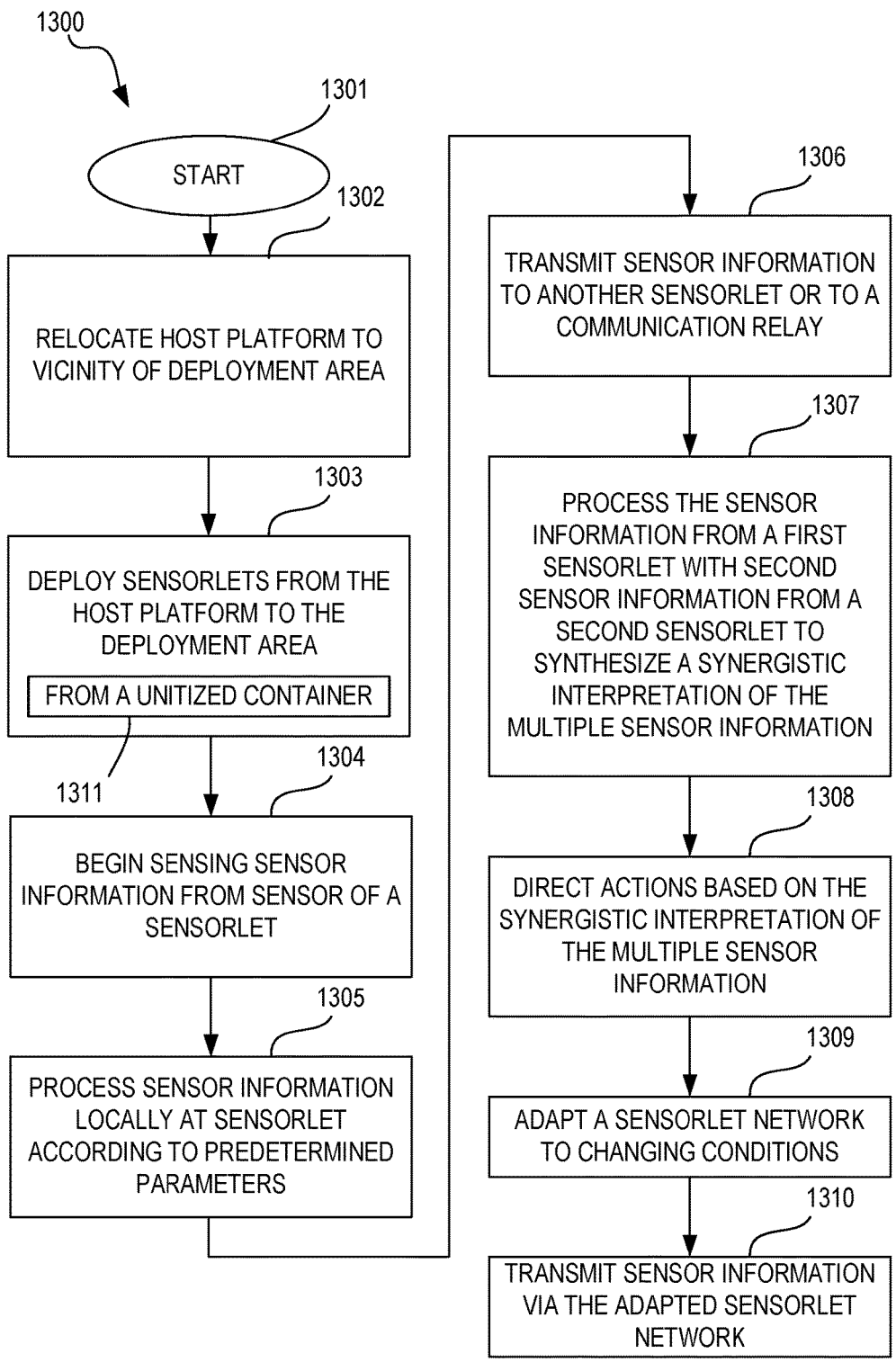
FIG. 13 is a flow diagram illustrating a method in accordance with at least one embodiment.

FIG. 13 is a flow diagram illustrating a method in accordance with at least one embodiment. Method 1300 begins at block 1301 and continues to block 1302. At block 1302, a host platform is relocated to a vicinity of a deployment area in which sensorlets are to be deployed. As an example, the host platform can fly, glide, float, or otherwise be transported to the vicinity of the deployment area. Depending on the standoff capability of the sensorlets, the vicinity to which the host platform is relocated may be farther from or nearer to final deployment locations of the sensorlets. From block 1302, method 1300 continues to block 1303. At block 1303, sensorlets are deployed from the host platform to the deployment area. As one example, the sensorlets are individually deployed directly from the host platform. As another example, illustrated in block 1311, the sensorlets are individually deployed from a unitized container. The unitized container may be deployed from the host platform. From block 1303, method 1300 continues to block 1304. At block 1304, the sensing of sensor information from a sensor of a sensorlet of the sensorlets begins. The sensing can begin, as one example, while the sensorlets are being deployed or, as another example, after the sensorlets have reached their final deployment locations. From block 1304, method 1300 continues to block 1305. At block 1305, the sensor information is processed locally at the sensorlet according to predetermined parameters. From block 1305, method 1300 continues to block 1306. At block 1306, sensor information is transmitted to another sensorlet, according to one embodiment, or to a communication relay, according to another embodiment. According to yet another embodiment, the sensor information can be transmitted both to another sensorlet and to a communication relay. The communication relay can relay the communication to a distant location. Sensor information transmitted to another sensorlet can be further transmitted to yet other sensorlets. As an example, the sensor information can be transmitted successively from one sensorlet to another among multiple successive sensorlets. From block 1306, method 1300 continues to block 1307. At block 1307, the sensor information from a first sensorlet is processed with second sensor information from a second sensorlet to synthesize a synergistic interpretation of the multiple sensor information. From block 1307, method 1300 continues to block 1308. At block 1308, actions are directed based on the synergistic interpretation of the multiple sensor information. As an example, other resources, such as aircraft or vehicles, can be dispatched to one or more locations based on the synergistic interpretation of the multiple sensor information. From block 1308, method 1300 continues to block 1309. At block 1309, the sensorlet network is adapted to changing conditions. As an example, a mesh network of sensorlets can adapt to the loss of an existing network node (e.g., a sensorlet or a communication relay) from the network or the inclusion of an additional network node into the network. As an example, a sensorlet network can adapt to changing networking configuration conditions, resulting in an adapted sensorlet network. From block 1309, method 1300 continues to block 1310. At block 1310, sensor information is transmitted via the adapted sensorlet network. As an example, sensor information can be routed through an adapted mesh network according to an updated routing table.

Figure 14:
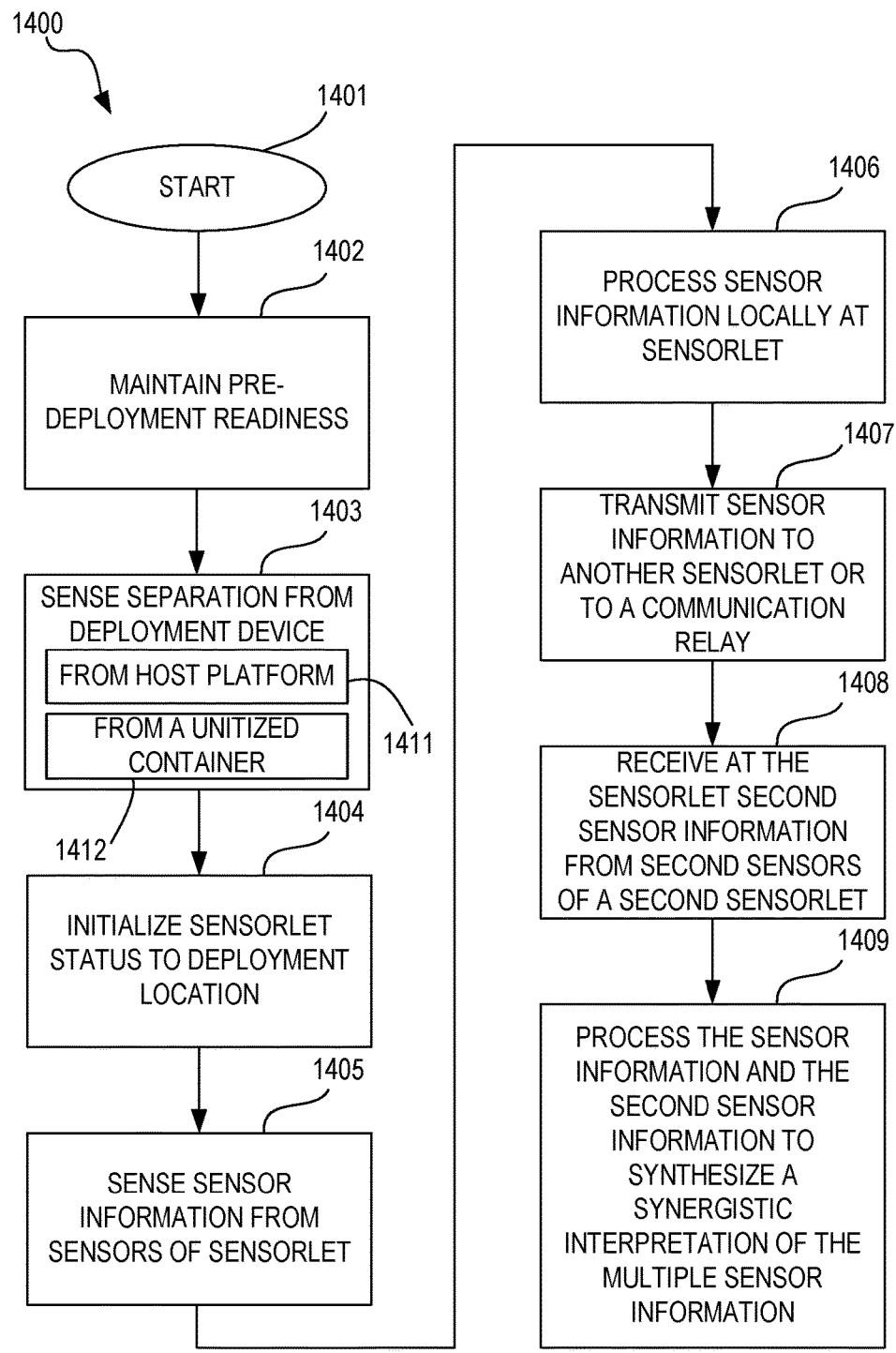
FIG. 14 is a flow diagram illustrating a method in accordance with at least one embodiment.

FIG. 14 is a flow diagram illustrating a method in accordance with at least one embodiment. Method 1400 begins at block 1401 and continues to block 1402. At block 1402, pre-deployment readiness is maintained. As an example, a battery charge of a battery of a sensorlet can be maintained, adding additional charge by recharging when appropriate. From block 1402, method 1400 continues to block 1403. At block 1403, separation of the sensorlet from the deployment device is sensed. As an example, as illustrated in block 1411, separation of the sensorlet from the host platform is sensed. The deployment device may comprise, as examples, a UAV or an aeronautically deployable unitized container. As an example, as illustrated in block 1412, separation of the sensorlet from a unitized container is sensed. From block, 1403, method 1400 continues to block 1404. At block 1404, the sensorlet status is initialized to a deployment location. As an example, a sensorlet can use a location determining component, such as a satellite receiver, to determine a deployment location of the sensorlet. The sensorlet can prepare to use the deployment location information to include with transmissions of sensor information, as one example. From block 1404, method 1400 continues to block 1405. At block 1405, sensor information is sensed from sensors of the sensorlet. As an example, sensor information can be sensed from sensors, such as vibration sensors, optical sensors, audio sensors, light sensors, magnetic sensors, motion sensors, radio frequency (RF) sensors, location sensors, and so on. From block 1405, method 1400 continues to block 1406. At block 1406, sensor information is processed locally at the sensorlet. As an example, the sensorlet can apply pre-determined or adaptively determined filters to the sensor information to validate the sensor information and to minimize noise affecting the sensors. As another example, the sensorlet can correlate sensor information obtained from a plurality of sensors of the sensorlet. From block 1406, method 1400 continues to block 1407. At block 1407, sensor information is transmitted to another sensorlet or to a communication relay. As an example, the sensor information can be transmitted to a plurality of other sensorlets. From block 1407, method 1400 continues to block 1408. At block 1408, the sensorlet receives second sensor information from second sensors of a second sensorlet. The sensorlet can also obtain additional sensor information from a plurality of other sensorlets. From block 1408, method 1400 continues to block 1409. At block 1409, the sensor information and the second sensor information are processed to synthesize a synergistic interpretation of the multiple sensor information. As an example, the sensorlet can correlate the sensor information with the second sensor information. As another example, the sensorlet can observe trends between the sensor information and the second sensor information, such as changes in timing, intensity, duration, frequency, or other parameters. The sensorlet can infer changes such as changes in location or in a level of activity based on the observed trends. The sensorlet can transmit information descriptive of the observed trends or the inferred changes to another sensorlet or to a communication relay. Actions can be taken based on such information.

Figure 15:
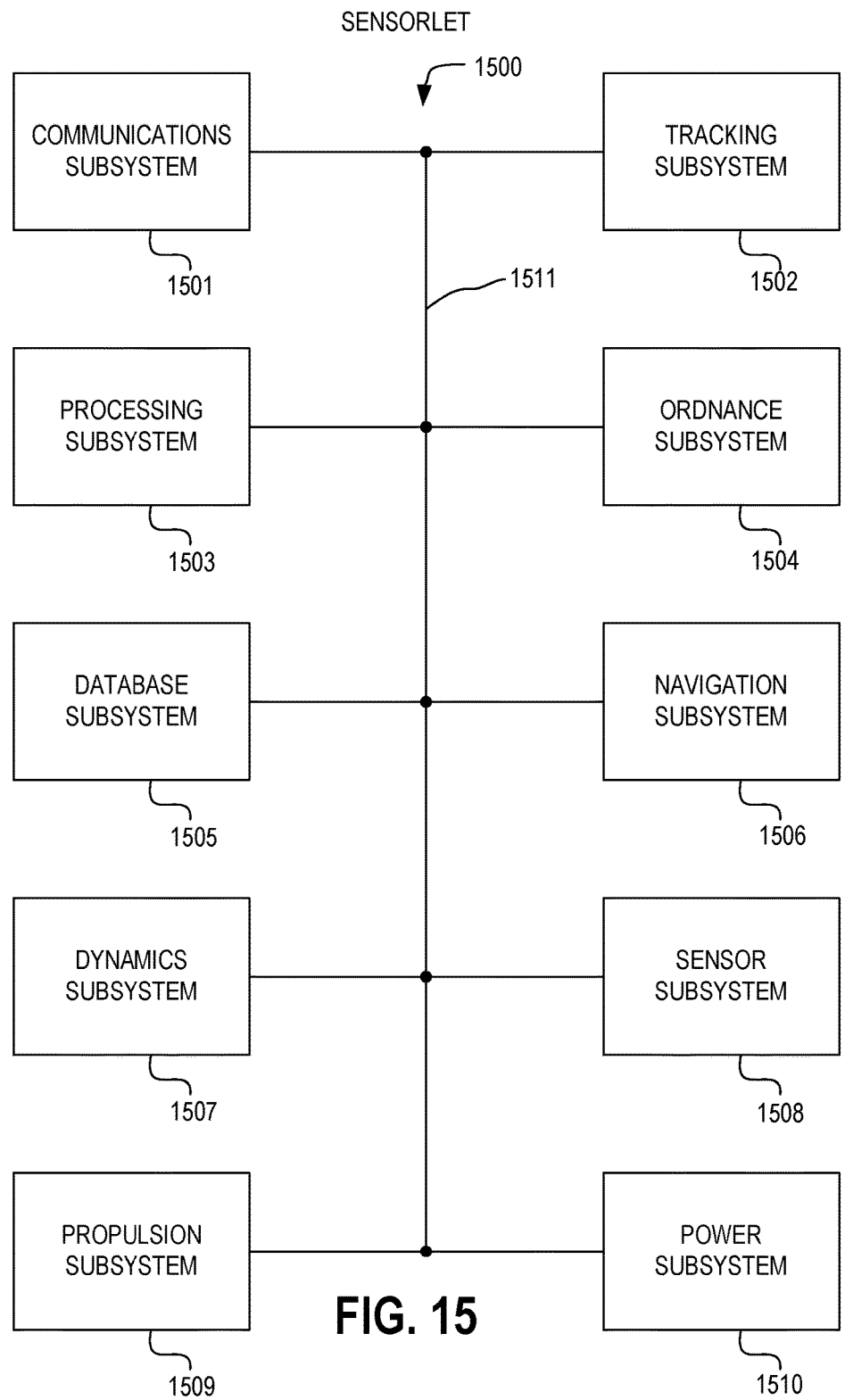
FIG. 15 is a block diagram illustrating a sensorlet in accordance with at least one embodiment.

FIG. 15 is a block diagram illustrating a sensorlet in accordance with at least one embodiment. Sensorlet 1500 comprises communications subsystem 1501, tracking subsystem 1502, processing subsystem 1503, ordnance subsystem 1504, database subsystem 1505, navigation subsystem 1506, dynamics subsystem 1507, sensor subsystem 1508, propulsion subsystem 1509, and power subsystem 1510. Each of such subsystems is coupled to at least another of such subsystems. In the illustrated example, the subsystems are coupled to each other via interconnect 1511. Other embodiments may be implemented with a subset of the above subsystems or with additional subsystems beyond the above subsystems or a subset thereof.

Communication subsystem 1501 of sensorlet 1500 can be used, for example, to communicate with other sensorlets and, for example, to communicate with distributed sensorlet system 100. Such communication can be used, for example, to coordinate a network of sensorlets.

Tracking subsystem 1502 of sensorlet 1500 can provide tracking of sensorlet 1500 relative to distributed sensorlet system 100, tracking of other sensorlets relative to sensorlet 1500, and tracking of potential targets and confirmed targets. Tracking subsystem can utilize radar, radio frequency (RF), optical, acoustic, and other types of tracking components.

Processing subsystem 1503 of sensorlet 1500 can send and receive information from other subsystems of sensorlet 1500. Processing subsystem 1503 can obtain data from database subsystem 1505 and can use the data obtained to characterize the information received from other subsystems of sensorlet 1500. Processing subsystem 1503 can also send and receive information to and from other entities, such as other sensorlets and distributed sensorlet system 100, via communication subsystem 1501. Processing subsystem 1503 of sensorlet 1500 can be configured to communicate with another sensorlet. The first and second sensorlets can use either or both of their respective processing subsystems to plan cooperative engagement of a confirmed target by at least one of the sensorlets in coordination with the other sensorlet. The first and second sensorlets can be configured to deploy cooperatively with additional sensorlets.

Ordnance subsystem 1504 of sensorlet 1500 can provide elements to defeat targets to be engaged by sensorlet 1500. As examples, ordnance subsystem 1504 may comprise an explosive charge in an unprefragmented housing, an explosive charge in a prefragmented housing, thermobaric explosive payload, an electromagnetic explosive payload, or another type of explosive payload. As another example, ordnance subsystem 1504 may comprise a kinetic payload to impact matter with a target. As another example, ordnance subsystem 1504 may comprise a non-explosive electromagnetic payload, such as a laser or high-energy RF (HERF), payload to deliver intense electromagnetic energy to a target. In accordance with at least one embodiment, ordnance subsystem 1504 can provide an "aerial mine" capability to sensorlet 1500, with other subsystems of sensorlet 1500 positioning sensorlet 1500 in an expected path of a target and ordnance subsystem 1504 engaging the target in proximity to sensorlet 1500. The ordnance is deliverable by one or more sensorlets against one or more targets. At least a portion of the ordnance is expendable against the one or more targets.

Navigation subsystem 1506 of sensorlet 1500 allows sensorlet 1500 to obtain information as to its location. Sensorlet 1500 can obtain information as to the locations of other objects, such as other sensorlets, distributed sensorlet system 100, and one or more targets, for example, via communication subsystem 1501. Processing subsystem 1503 can process the locations, as well as directions and speeds of motions, to map out the space within which sensorlet 1500 operates. Sensorlet 1500 can pass its location information and its mapping of space to other objects, such as other sensorlets and distributed sensorlet system 100, which can map out the spaces within which they operate.

Dynamics subsystem 1507 provides compensation for dynamics effects on sensorlet 1500. As an example, dynamics subsystem 1507 can adjust elements of sensorlet 1500 to compensate for the effect of wind on the flight of sensorlet 1500. As other examples, dynamics subsystem 1507 can adjust elements of sensorlet 1500 to compensate for effects of temperature, humidity, barometric pressure, precipitation, and other phenomena on the flight of sensorlet 1500. As another example, dynamics subsystem 1507 can adjust elements of sensorlet 1500 to compensate for effects of speed on aerodynamic surfaces of sensorlet 1500 and for effects of weight distribution in sensorlet 1500.

Sensor subsystem 1508 can includes sensors for detecting information from the environment around sensorlet 1500. For example, sensor subsystem 1508 can include still cameras, video cameras, infrared cameras, ultraviolet cameras, multispectral cameras, radars, RF sensors, optical sensors, acoustic sensors, pressure sensors, altimeters, airspeed sensors, wind sensors, chemical sensors, and other sensors. Information from such sensors can be used by processing subsystem 1503 and can supplement information used by other sensorlets and distributed sensorlet system 100, which can be communicated by communications subsystem 1501. Information from such sensors can be supplemented by information from sensors of other objects, such as other sensorlets and distributed sensorlet system 100, which can be received by communications subsystem 1501.

Propulsion subsystem 1509 can include motors, for example, for vertical propulsion to keep sensorlet 1500 aloft and, for example, for horizontal propulsion to move sensorlet 1500 from one location to another. Propulsion subsystem 1509 can include feedback sensors or can obtain feedback from other subsystems, such as navigation subsystem 1506, to determine actual propulsion provided by propulsion subsystem 1509.

Power subsystem 1510 can include a battery system, such as a rechargeable battery system, a charging system, a battery management system, and a load management system to manage the operation of sensorlet 1500 in response to the state of charge of its battery system. As an example, sensorlet 1500 can be configured to return to distributed sensorlet system 100 as a state of charge of the battery system declines past a predetermined value. The return of sensorlet 1500 to distributed sensorlet system 100 can be coordinated with other sensorlets to avoid collision of multiple returning sensorlets to distributed sensorlet system 100. Upon return of sensorlet 1500 to distributed sensorlet system 100, distributed sensorlet system 100 can use its power subsystem to recharge the battery system of power subsystem 1510 of sensorlet 1500. With sufficient state of charge in the battery system of power subsystem 1510 of sensorlet 1500, sensorlet 1500 can again take flight from distributed sensorlet system 100 to resume its mission or to be tasked to perform a new mission.

In accordance with at least one embodiment, the distributed sensorlet system can act as a docking station for a plurality of sensorlets. The sensorlets can be deployed individually or in small numbers, for example, to act as aerial scouts for reconnaissance of potential threats. As the individual or few sensorlets return to the distributed sensorlet system for replenishment, such as recharging of their batteries, another sensorlet or other sensorlets can be deployed from the distributed sensorlet system to maintain constant vigilance. As one example, the distributed sensorlet system can manage deconfliction of incoming and outgoing sensorlets. As another example, the sensorlets can coordinate with each other to manage their own deconfliction.

As another example, the sensorlets can be deployed in large numbers, up to and including all of the sensorlets carried by the distributed sensorlet system. A portion of a large number of sensorlets can return to the distributed sensorlet system for replenishment, such as recharging of their batteries and, for embodiments where the ordnance is separable from the sensorlets, reloading ordnance.

In accordance with at least one embodiment, the sensorlets can use their own sensing and tracking subsystems to sense and track one or more targets. The sensorlets can coordinate their sensing and tracking of targets using their communication subsystems. The sensorlets can coordinate their employment of ordnance to engage one or more targets using their communication subsystems. In accordance with at least one embodiment, the sensorlets can obtain sensing and tracking information from another source, such as from the distributed sensorlet system, from a naval surface ship, from a naval submarine, from an aircraft, or from a spacecraft, such as a satellite.

In accordance with at least one embodiment, the sensorlets can maintain a deployed configuration flying in formation with each other, ready for any threat that may be encountered. In accordance with at least one embodiment, the sensorlets can respond reactively to detection of a threat, forming a flying formation in response to the detection. In either case, the formation may be predefined or may be adaptive to the detected threat. As an example, the formation may be configured to exhibit a swarm behavior dynamically presenting a distribution of sensorlets in airspace configured to optimize a likelihood of interception of the detected threat. As another example, the formation may be configured to exhibit a counter-swarm behavior dynamically presenting a distribution of sensorlets in airspace configured to optimize a likelihood of interception of a large number of simultaneous threats, such as threats flying in the form of a swarm.

As an example, a sensorlet can obtain information about an expected flight path of a threat using its own sensor subsystem and tracking subsystem or with the assistance of other assets, such as one or more other sensorlets and one or more naval surface vessels, naval subsurface vessels, aircraft, or spacecraft. The sensorlet can extrapolate the expected flight path of the threat to an expected intercept point accessible to the ordnance of one or more sensorlets within the time constraints imposed by the approaching threat. The sensorlet can direct itself, another sensorlet, or a combination thereof to the expected intercept point. As the threat approaches the expected intercept point, the sensorlet or other sensorlet or sensorlets directed to the expected intercept can relocate to adapt their position to a refined expected intercept point. In the case of multiple sensorlets being deployed to intercept the target, the sensorlets can be deployed in a formation, such as a uniform spatial distribution or a weighted spatial distribution, in the vicinity of the expected intercept point. In the case of multiple targets against which multiple sensorlets are deployed, the sensorlets can be directed to multiple respective expected intercept points to provide a counter-swarm configuration of the multiple sensorlets to engage the multiple targets. In accordance with at least one embodiment, the expected intercept point or multiple respective intercept points can be based on one or more expected paths of one or more targets, wherein the one or more expected paths can be one or more expected flight paths for one or more airborne threats or one or more expected surface paths for one or more surface threats, such as hostile surface vessels, for example, hydrofoil surface vessels or high-speed gunboats.

Figure 16:
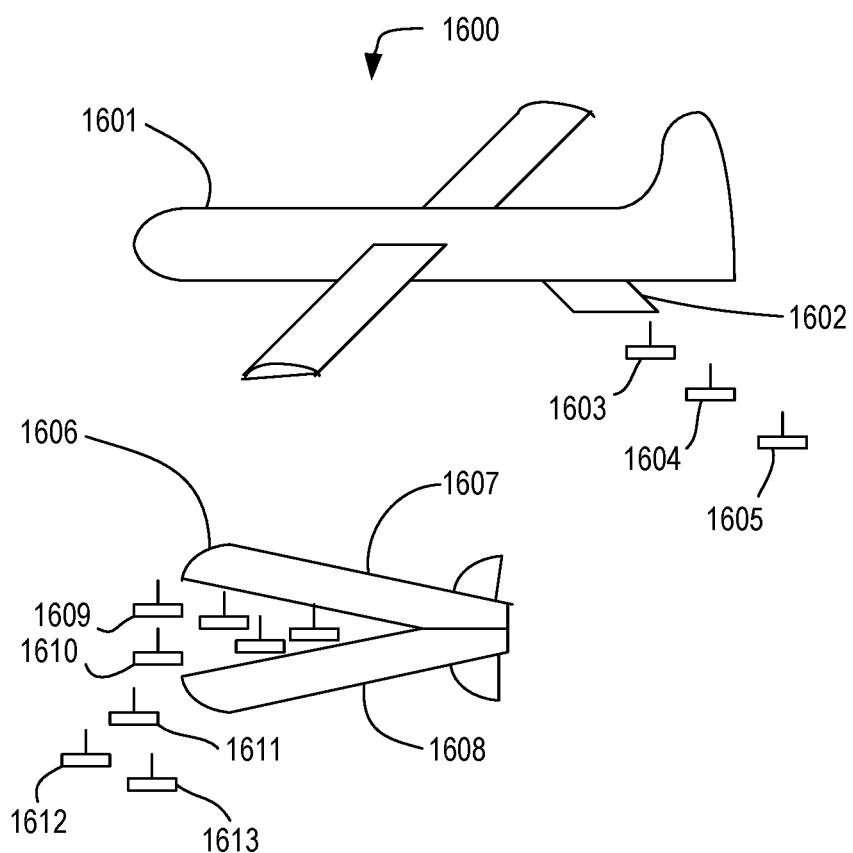
FIG. 16 is a perspective view diagram illustrating a distributed sensorlet system according to at least one embodiment.

FIG. 16 is a perspective view diagram illustrating a distributed sensorlet system according to at least one embodiment. Distributed sensorlet system 1600 comprises a host platform, such as UAV 1601, for aerially dispersing sensorlets to their deployed locations. In accordance with at least one embodiment, the host platform may individually disperse sensorlets, as shown by UAV 1601 individually dispersing sensorlets 1603, 1604, and 1605 via chute 1602 of UAV 1601. In accordance with at least one embodiment, the host platform may deploy a unitized container 1606 holding a plurality of sensorlets. Unitized container 1606 is configured to open and release the contained sensorlets. As one example, a preexisting seam may be defined between a first portion 1607 and a second portion 1608 of unitized container 1606, and the seam may be configured to separate to release the contained sensorlets. For example, unitized container 1606 may be configured to utilize aerodynamic drag to create force to separate first portion 1607 from second portion 1608 of unitized container 1606. As another example, unitized container 1606 may be equipped with a device, such as a linear shaped charge, to split apart unitized container 1606 to release the contained sensorlets. As shown, the separation of first portion 1607 and second portion 1608 releases sensorlets 1609, 1610, 1611, 1612, and 1613, among others.

In accordance with at least one embodiment, the sensorlets are electrically configured to be in an undeployed electrical state prior to deployment and in a deployed electrical state upon and after deployment. As an example, a sensorlet can be stored in the host platform in an undeployed state, and the host platform can activate a switch to place a sensorlet in the deployed state. The activation of the switch can be performed, for example, by pulling a line, such as a cord, a wire, or a cable, connected to the switch to activate the switch. As another example, the host platform can apply or remove a magnet to or from a non-ferromagnetic portion of a sensorlet housing to activate a magnetic switch, such as a reed switch, underlying the non-ferromagnetic portion of the sensorlet housing. As another example, the host platform can remove or insert a plug from or into a sensorlet to activate the switch. As another example, a condition expect to occur during deployment, such as exposure to light, wind (e.g., arising from the airspeed of a host platform during deployment), or another ambient condition can be sensed and used to turn on the sensorlet. As an example, the sensorlet can sense the condition itself, after it has left the host platform. As another example, a unitized container can be configured to activate the switches of the sensorlets it contains as part of its process of releasing the sensorlets from the unitized container.

A unitized container containing a plurality of sensorlets can be attached to mounting points on a host platform, for example, a UAV, an aerostat UAS, or another aircraft, such as an airplane or a helicopter. The attachment can be in the form, as one example, of a releasable latch or, as another example, in the form of an electroexplosive device (EED), such as an exploding bolt that can be remotely triggered to release the unitized container from the host platform.

In accordance with at least one embodiment, an electrical interconnect may be provided to electrically couple one or more of the sensorlets to the host platform. As an example, an electrical interconnect can provide a power connection to one or more sensorlets. The power connection can provide electrical power that can be used to charge and maintain the electrical state of charge of a battery of a sensorlet storing power for the sensorlet to use. As one example, the power connection can be provided individually to each of a plurality of sensorlets. As another example, the power connection can be provided in the form of a bus connected to each of the plurality of sensorlets. As yet another example, the power connection can be provided to a first sensorlet of the plurality of sensorlets, and the first sensorlet can convey the electric power to a second power connection with a second sensorlet, allowing electric power to be provided from one sensorlet to another in a daisy-chain manner.

As another example, the electrical interconnect can provide communication of signals, such as data signals and control signals, between the host platform and the plurality of sensorlets. For example, the host platform can interrogate via the electrical interconnect an operational capability of one or more of the plurality of sensorlets. As another example, the host platform can provide via the electrical interconnect updated information to one or more of the plurality of sensorlets. For example, the host platform can provide via the electrical interconnect mission tasking information to one or more of the plurality of sensorlets. Such mission tasking information can include, for example, one or more parameters for the one or more sensorlets to apply to the one or more sensors or one or more processors, such as a digital signal processing (DSP) processor, of a sensorlet. As an example, the one or more parameters can include one or more filtering parameters to tailor the response of the one or more sensorlets to be deployed to match the expected stimulus of one or more objects or phenomena to be sensed by the one or more sensorlets.

As with the description of the power connection, a signal connection for communicating signals, such as data signals and control signals, can be individually connected to each of a plurality of sensorlets, can be connected to a bus connected to each of one or more of the plurality of sensorlets, or can be connected to a first sensorlet of the plurality of sensorlets, and the first sensorlet can convey the data signals and control signals to a second sensorlet, and so on, providing communication of the data signals and control signals in a daisy-chained manner among the plurality of sensorlets. The power connection and the signal connection can be separate electrical connections, or the signal connection can be multiplexed over the power connection. As another example, either or both of the power connection and the signal connection can be implemented as a wireless connection as an alternative to a wired connection.

The electrical interconnect can include, as one example, a connection from the host platform to one or more of a plurality of sensorlets. As another example, the electrical interconnect can include a connection from a unitized container to one or more of a plurality of sensorlets within the unitized container. The electrical interconnect can include a connection from the host platform to the unitized container. Thus, for example, the plurality of sensorlets can be kept in a state of readiness, for example, with their batteries charged and with their firmware and parameters updated, even while they remain stored within the unitized container.

Even in their undeployed state, a plurality of sensorlets can communicate with each other, for example, within a host platform or within a unitized container attached to or contained within a host platform. For example, the plurality of sensorlets can share information about each other, such as identifiers, types of sensors, processing capabilities communication capabilities, and so on. Such information can be used to populate databases within the sensorlets regarding tentative network nodes of a network comprising the plurality of sensorlets as network nodes. As another example, information as to the organization of sensorlets within a host platform or within a unitized container can be compared to the geographic distribution of the same sensorlets after deployment, and the comparison can be used to optimize the spatial distributions of future sensorlets upon deployment.

While the sensorlets are depicted as rectangular housings with an antenna on top, sensorlet shapes and configurations can have attributes to accommodate conditions the sensorlets may encounter before, during, and after deployment. For example, the sensorlets may have spherical, cylindrical, triangularly prismatic, rectangularly prismatic, hexagonally prismatic, pyramidal, or other shapes. At least some of such shapes can accommodate dense packing of sensorlets within a host platform or a unitized container. As another example, sensorlets may have an aerodynamically favorable shape, such as a teardrop shape. As a further example, sensorlets may have an airfoil shape to allow gliding flight during deployment, which can increase standoff distance. As yet another example, sensorslets may have aerodynamic drag enhancement, for example, a high drag shape or an additional feature, such as a streamer or parachute, to allow for a more controlled landing of the sensorlets on the ground or another surface. In accordance with at least one embodiment, a sensorlet may comprise a propulsion system, such as one or more rotor blades, which can allow increased standoff distances from the host platform to the sensorlet deployment locations.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A distributed sensor module system comprising:
a deployment device comprising a communication node and configured to transport a plurality of sensor modules to a deployment location; and
the plurality of sensor modules configured to sense separation from the deployment device,
wherein the deployment device comprises an unmanned aerial vehicle (UAV) or an aeronautically deployable unitized container, and
wherein each of the plurality of sensor modules is configured to communicate with other sensor modules of the plurality of sensor modules and with the communication node of the deployment device.

2. The distributed sensor module system of claim 1, wherein the plurality of sensor modules are configured to communicate with a communication relay.

3. The distributed sensor module system of claim 1, wherein the plurality of sensor modules are configured to communicate with each other via a mesh network, and wherein a first sensor module of the plurality of sensor modules is configured to communicate with a second sensor module of the plurality of sensor modules via messaging relay by a third sensor module of the plurality of sensor modules.

4. The distributed sensor module system of claim 1, wherein a first sensor of a first sensor module of the plurality of sensor modules includes a vibration sensor, a location sensor, an optical sensor, an audio sensor, or a combination thereof.

5. The distributed sensor module system of claim 1, wherein a first sensor module of the plurality of sensor modules is configured to correlate first sensor information from a first sensor of the first sensor module with second sensor information of a second sensor of a second sensor module.

6. The distributed sensor module system of claim 1, wherein attributes of multiple sensor information recognizable as relating to an event or activity are usable to build a model based on the multiple sensor information.

7. The distributed sensor module system of claim 6, further comprising:
an aerial resource, the aerial resource configured to obtain the multiple sensor information from the plurality of sensor modules and to build the model.

8. A first sensor module comprising:
a first sensor configured to obtain first sensor information from a first environment proximate to the first sensor;
a processor coupled to the first sensor, the processor configured to process the first sensor information to obtain locally processed first sensor information; and
a communication transceiver coupled to the processor, the communication transceiver configured to communicate the locally processed first sensor information to a second sensor module of a mesh network via a third sensor module of the mesh network,
wherein the first sensor module is configured to sense separate from a deployment device.

9. The first sensor module of claim 8, wherein the first sensor includes a vibration sensor, a location sensor, an optical sensor, an audio sensor, or a combination thereof.

10. The first sensor module of claim 8, wherein the first sensor module is configured to communicate with a communication relay.

11. The first sensor module of claim 8, wherein the processor is configured to correlate the first sensor information from the first sensor with second sensor information of a second sensor of the second sensor module.

12. The first sensor module of claim 8, wherein attributes of the first sensor information obtained at the first sensor module and of second sensor information obtained from the second sensor module recognizable as relating to an event or activity are usable to build a model based on the first sensor information and the second sensor information.

13. The first sensor module of claim 12, wherein the first sensor module is configured to communicate the first sensor information to an aerial resource, the aerial resource configured to obtain additional sensor information from a plurality of sensor modules and to build the model.

14. A method comprising:
sensing, at a first sensor module, separation from a deployment device;
based on sensing the separation from the deployment device, beginning sensing of first sensor information from a first sensor of the first sensor module;
locally processing the first sensor information at the first sensor module according to one or more parameters; and transmitting the first sensor information to another entity including a second sensor module, a communication relay, or both.

15. The method of claim 14, further comprising:
processing the first sensor information from the first sensor module with second sensor information from the second sensor module to synthesize a synergistic interpretation of the first sensor information and the second sensor information.

16. The method of claim 14, wherein the transmitting the first sensor information to another entity comprises:
transmitting the first sensor information to the second sensor module.

17. The method of claim 14, wherein a plurality of sensor modules, including the first sensor module, are deployed from the deployment device to a deployment area by:
deploying a unitized container from the deployment device, the unitized container containing the plurality of sensor modules; and
deploying the plurality of sensor modules from the unitized container.

18. The method of claim 14, further comprising:
directing actions based on synergistic interpretation of the first sensor information and second sensor information.

19. The method of claim 18, further comprising:
adapting a sensor module network to changing networking configuration conditions, resulting in an adapted sensor module network, wherein the adapted sensor module network provides communication between the sensor modules; and
transmitting sensor information via the adapted sensor module network.

* * * * *

UNITED STATES PATENT AND TRADEMARK OFFICE
CERTIFICATE OF CORRECTION

PATENT NO. : 10,207,816 B1
APPLICATION NO. : 15/704991
DATED : February 19, 2019
INVENTOR(S) : Syed Mohammad Amir Husain et al.

Page 1 of 1

It is certified that error appears in the above-identified patent and that said Letters Patent is hereby corrected as shown below:

In the Claims

Column 22, Claim 8, Line 36, "separate from a deployment device" should read --separation from a deployment device--.

Column 23, Claim 19, Lines 29-30, "module network provides communication between the sensor modules" should read --module network provides communication between sensor modules--.

Signed and Sealed this
Second Day of July, 2019

Andrei Iancu
*Director of the United States Patent and Trademark Office*